United States Patent [19]
Melas et al.

[11] Patent Number: 5,535,187
[45] Date of Patent: Jul. 9, 1996

[54] HIGH CAPACITY RUN-LENGTH-LIMITED CODING SYSTEM EMPLOYING ASYMMETRIC AND EVEN-SPACED CODES

[75] Inventors: Constantin M. Melas, Los Gatos; Daniel Rugar, Los Altos; Pantas Sutardja, San Jose; Roger W. Wood, Gilroy, all of Calif.

[73] Assignee: Intenational Business Machines Corporation, Armonk, N.Y.

[21] Appl. No.: 167,104

[22] Filed: Dec. 15, 1993

[51] Int. Cl.$^6$ ............................................. G11B 5/09
[52] U.S. Cl. ................................ 369/59; 360/40
[58] Field of Search .................... 360/40, 32, 49, 360/51, 54, 53; 369/59; 341/58, 59

[56] References Cited

U.S. PATENT DOCUMENTS

| | | | |
|---|---|---|---|
| 4,823,209 | 4/1989 | Minuhin | 360/40 X |
| 4,928,187 | 5/1990 | Rees | 360/40 |
| 4,949,196 | 8/1990 | Davie et al. | 360/40 |
| 5,173,694 | 12/1992 | Lynch, Jr. et al. | 341/59 |
| 5,198,813 | 3/1993 | Ibozaki | 360/40 X |
| 5,270,714 | 12/1993 | Tanaka et al. | 360/40 X |

OTHER PUBLICATIONS

Norris, "Channel Capacity of Change-Constrained Run-length-limited codes", IEE Tranas. Mag. vol. Mag-17 pp. 3452-3455, Nov. 1981.

Finn Jorgensen, "Chapter 24: Modulation Codes", *The complete handbook of magnetic recording*, by Tab Books, pp. 538-550, Jan. 1988.

D. Rugar and P. Siegel, "Recording Results and Coding Considerations for the Resonant Bias Coil Overwrite Technique", SPIE vol. 1078, Optical Data Storage Topical Meeting, pp. 265-270. Jan. 1989.

Paul Funk, "Run-Length-Limited Codes with Multiple Spacing", IEEE Transactions on Magnetics, vol. Mag-18, No. 2, Mar. 1982, pp. 772-775.

*Primary Examiner*—Donald T. Hajec
*Assistant Examiner*—Thien Minh Le
*Attorney, Agent, or Firm*—Baker, Maxham, Jester & Meador

[57] ABSTRACT

A system for encoding and decoding binary data in a data transmission system, such as a magnetic or optical data storage channel. The encoding process is implemented as a two-step RLL coding procedure wherein the original user bit data are first encoded as an asymmetric RLL code signal at a reduced clock rate and then translated to a second even-spaced RLL code signal suitable for recording to a data storage medium at a full-speed clock rate. The system also provides for recovering suitable even-spaced RLL codes recorded at a full-speed clock rate, translating the recovered even-spaced RLL code signal to an asymmetric RLL code signal at a reduced clock rate, and then decoding the asymmetric RLL code signal to recover the original user bit data. A preferred embodiment uses a rate ⅖ (2, 16, 2) even-spaced RLL code at a full-speed clock rate and a rate ⅕ (0,7; 1,8) asymmetric RLL code at a half-speed clock rate. The rate ⅘ asymmetric RLL code has a high capacity and the rate ⅖ even-spaced RLL code has a wide detection window. The intercode translation procedure requires only simple time-delay circuitry.

59 Claims, 24 Drawing Sheets

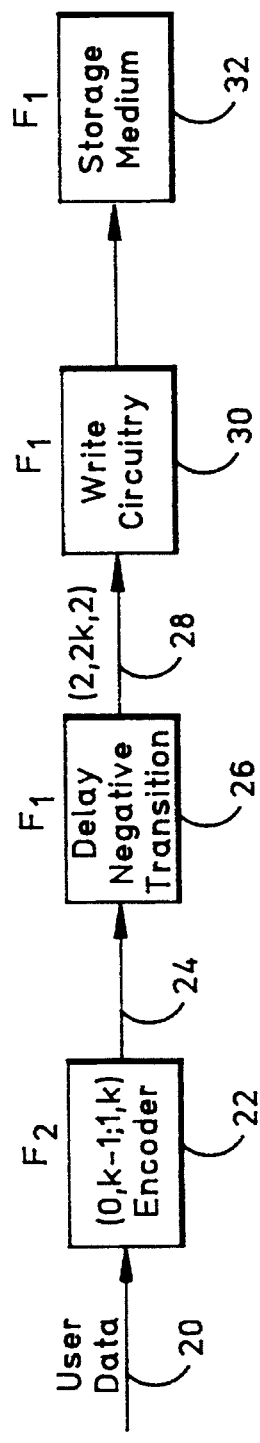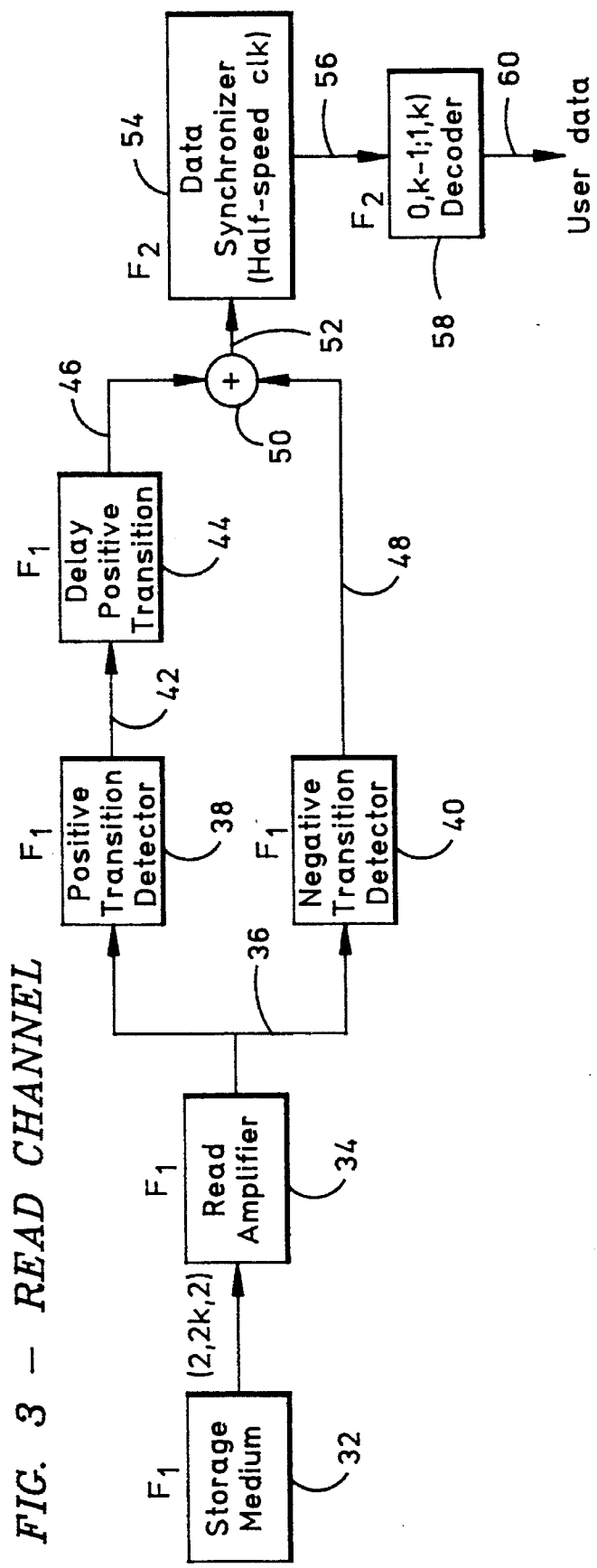
FIG. 2 — WRITE CHANNEL
FIG. 3 — READ CHANNEL

| Present State | Data Bits | Code Symbol | Next State |
|---|---|---|---|
| 1 | 00 | 00100 | 1 |
| 1 | 01 | 00100 | 2 |
| 1 | 10 | 00100 | 3 |
| 1 | 11 | 00100 | 17 |
| 2 | 00 | 00100 | 4 |
| 2 | 01 | 00100 | 18 |
| 2 | 10 | 00100 | 19 |
| 2 | 11 | 00100 | 20 |
| 3 | 00 | 00100 | 5 |
| 3 | 01 | 00100 | 21 |
| 3 | 10 | 00100 | 22 |
| 3 | 11 | 00100 | 23 |
| 4 | 00 | 00000 | 8 |
| 4 | 01 | 00000 | 9 |
| 4 | 10 | 00000 | 10 |
| 4 | 11 | 00000 | 11 |
| 5 | 00 | 00001 | 1 |
| 5 | 01 | 00001 | 2 |
| 5 | 10 | 00001 | 3 |
| 5 | 11 | 00001 | 4 |
| 6 | 00 | 00000 | 13 |
| 6 | 01 | 00000 | 14 |
| 6 | 10 | 00000 | 15 |
| 6 | 11 | 00000 | 16 |
| 7 | 00 | 00001 | 5 |
| 7 | 01 | 00001 | 6 |
| 7 | 10 | 00001 | 7 |
| 7 | 11 | 00000 | 12 |
| 8 | 00 | 01000 | 8 |
| 8 | 01 | 01000 | 9 |
| 8 | 10 | 01000 | 10 |
| 8 | 11 | 01000 | 11 |
| 9 | 00 | 01000 | 13 |
| 9 | 01 | 01000 | 14 |
| 9 | 10 | 01000 | 15 |
| 9 | 11 | 01000 | 16 |
| 10 | 00 | 01001 | 1 |
| 10 | 01 | 01001 | 2 |
| 10 | 10 | 01001 | 3 |
| 10 | 11 | 01000 | 12 |
| 11 | 00 | 01001 | 4 |
| 11 | 01 | 01001 | 5 |
| 11 | 10 | 01001 | 6 |
| 11 | 11 | 01001 | 7 |
| 12 | 00 | 00010 | 8 |
| 12 | 01 | 00010 | 9 |
| 12 | 10 | 00010 | 10 |
| 12 | 11 | 00010 | 11 |
| 13 | 00 | 00010 | 13 |
| 13 | 01 | 00010 | 14 |
| 13 | 10 | 00010 | 15 |
| 13 | 11 | 00010 | 16 |
| 14 | 00 | 00000 | 1 |
| 14 | 01 | 00000 | 2 |
| 14 | 10 | 00000 | 3 |
| 14 | 11 | 00010 | 12 |
| 15 | 00 | 00000 | 18 |
| 15 | 01 | 00000 | 19 |
| 15 | 10 | 00000 | 20 |
| 15 | 11 | 00000 | 21 |
| 16 | 00 | 00000 | 4 |
| 16 | 01 | 00000 | 5 |
| 16 | 10 | 00000 | 22 |
| 16 | 11 | 00000 | 23 |
| 17 | 00 | 00000 | 13 |
| 17 | 01 | 00000 | 14 |
| 17 | 10 | 00000 | 15 |
| 17 | 11 | 00000 | 12 |
| 18 | 00 | 10000 | 17 |
| 18 | 01 | 10000 | 18 |
| 18 | 10 | 10000 | 19 |
| 18 | 11 | 10000 | 20 |
| 19 | 00 | 10000 | 4 |
| 19 | 01 | 10000 | 5 |
| 19 | 10 | 10000 | 22 |
| 19 | 11 | 10000 | 23 |
| 20 | 00 | 10000 | 1 |
| 20 | 01 | 10000 | 2 |
| 20 | 10 | 10000 | 3 |
| 20 | 11 | 10000 | 21 |
| 21 | 00 | 10010 | 8 |
| 21 | 01 | 10010 | 9 |
| 21 | 10 | 10010 | 10 |
| 21 | 11 | 10010 | 11 |
| 22 | 00 | 10010 | 13 |
| 22 | 01 | 10010 | 14 |
| 22 | 10 | 10010 | 15 |
| 22 | 11 | 10010 | 16 |
| 23 | 00 | 00001 | 5 |
| 23 | 01 | 00001 | 6 |
| 23 | 10 | 00001 | 7 |
| 23 | 11 | 10010 | 12 |

FIG. 4

| Present State | Data Bits | (a)(2,16,2) NRZ Code Symbols | (b)(0,7;1,8) NRZ Code Symbols | Next State |
|---|---|---|---|---|
| 1 | 0000 | 0001111100 | 00110 | 1 |
| 1 | 0001 | 0001111100 | 00110 | 2 |
| 1 | 0010 | 0001111100 | 00110 | 3 |
| 1 | 0011 | 0001111100 | 00110 | 17 |
| 1 | 0100 | 0001111100 | 00110 | 4 |
| 1 | 0101 | 0001111100 | 00110 | 18 |
| 1 | 0110 | 0001111100 | 00110 | 19 |
| 1 | 0111 | 0001111100 | 00110 | 20 |
| 1 | 1000 | 0001111100 | 00110 | 5 |
| 1 | 1001 | 0001111100 | 00110 | 21 |
| 1 | 1010 | 0001111100 | 00110 | 22 |
| 1 | 1011 | 0001111100 | 00110 | 23 |
| 1 | 1100 | 0001111111 | 00111 | 13 |
| 1 | 1101 | 0001111111 | 00111 | 14 |
| 1 | 1110 | 0001111111 | 00111 | 15 |
| 1 | 1111 | 0001111111 | 00111 | 12 |

| Present State | Data Bits | (a)(2,16,2) NRZ Code Symbols | (b)(0,7;1,8) NRZ Code Symbols | Next State |
|---|---|---|---|---|
| 2 | 0000 | 0001111111 | 00111 | 8 |
| 2 | 0001 | 0001111111 | 00111 | 9 |
| 2 | 0010 | 0001111111 | 00111 | 10 |
| 2 | 0011 | 0001111111 | 00111 | 11 |
| 2 | 0100 | 0001110000 | 00100 | 17 |
| 2 | 0101 | 0001110000 | 00100 | 18 |
| 2 | 0110 | 0001110000 | 00100 | 19 |
| 2 | 0111 | 0001110000 | 00100 | 20 |
| 2 | 1000 | 0001110000 | 00100 | 4 |
| 2 | 1001 | 0001110000 | 00100 | 5 |
| 2 | 1010 | 0001110000 | 00100 | 22 |
| 2 | 1011 | 0001110000 | 00100 | 23 |
| 2 | 1100 | 0001110000 | 00100 | 1 |
| 2 | 1101 | 0001110000 | 00100 | 2 |
| 2 | 1110 | 0001110000 | 00100 | 3 |
| 2 | 1111 | 0001110000 | 00100 | 21 |

FIG. 6A

| Present State | Data Bits | (a)(2,16,2) NRZ Code Symbols | (b)(0,7;1,8) NRZ Code Symbols | Next State |
|---|---|---|---|---|
| 4 | 0000 | 0000000111 | 00001 | 8 |
| 4 | 0001 | 0000000111 | 00001 | 9 |
| 4 | 0010 | 0000000111 | 00001 | 10 |
| 4 | 0011 | 0000000111 | 00001 | 11 |
| 4 | 0100 | 0000000111 | 00001 | 13 |
| 4 | 0101 | 0000000111 | 00001 | 14 |
| 4 | 0110 | 0000000111 | 00001 | 15 |
| 4 | 0111 | 0000000111 | 00001 | 16 |
| 4 | 1000 | 0000000111 | 00001 | 1 |
| 4 | 1001 | 0000000111 | 00001 | 2 |
| 4 | 1010 | 0000000111 | 00001 | 3 |
| 4 | 1011 | 0000000111 | 00001 | 12 |
| 4 | 1100 | 0000000111 | 00001 | 4 |
| 4 | 1101 | 0000000111 | 00001 | 5 |
| 4 | 1110 | 0000000111 | 00001 | 6 |
| 4 | 1111 | 0000000111 | 00001 | 7 |

| Present State | Data Bits | (a)(2,16,2) NRZ Code Symbols | (b)(0,7;1,8) NRZ Code Symbols | Next State |
|---|---|---|---|---|
| 3 | 0000 | 0001111111 | 00111 | 1 |
| 3 | 0001 | 0001111111 | 00111 | 2 |
| 3 | 0010 | 0001111111 | 00111 | 3 |
| 3 | 0011 | 0001111111 | 00111 | 4 |
| 3 | 0100 | 0001110001 | 00100 | 8 |
| 3 | 0101 | 0001110001 | 00100 | 9 |
| 3 | 0110 | 0001110001 | 00100 | 10 |
| 3 | 0111 | 0001110001 | 00100 | 11 |
| 3 | 1000 | 0001110001 | 00100 | 13 |
| 3 | 1001 | 0001110001 | 00100 | 14 |
| 3 | 1010 | 0001110001 | 00100 | 15 |
| 3 | 1011 | 0001110001 | 00100 | 16 |
| 3 | 1100 | 0001111111 | 00111 | 5 |
| 3 | 1101 | 0001111111 | 00111 | 6 |
| 3 | 1110 | 0001111111 | 00111 | 7 |
| 3 | 1111 | 0001110001 | 00100 | 12 |

FIG. 6B

| Present State | Data Bits | (a)(2,16,2) NRZ Code Symbols | (b)(0,7;1,8) NRZ Code Symbols | Next State |
|---|---|---|---|---|
| 5 | 0000 | 0000011100 | 00010 | 1 |
| 5 | 0001 | 0000011100 | 00010 | 2 |
| 5 | 0010 | 0000011100 | 00010 | 3 |
| 5 | 0011 | 0000011100 | 00010 | 17 |
| 5 | 0100 | 0000011100 | 00010 | 4 |
| 5 | 0101 | 0000011100 | 00010 | 18 |
| 5 | 0110 | 0000011100 | 00010 | 19 |
| 5 | 0111 | 0000011100 | 00010 | 20 |
| 5 | 1000 | 0000011100 | 00010 | 5 |
| 5 | 1001 | 0000011100 | 00010 | 21 |
| 5 | 1010 | 0000011100 | 00010 | 22 |
| 5 | 1011 | 0000011100 | 00010 | 23 |
| 5 | 1100 | 0000011111 | 00011 | 8 |
| 5 | 1101 | 0000011111 | 00011 | 9 |
| 5 | 1110 | 0000011111 | 00011 | 10 |
| 5 | 1111 | 0000011111 | 00011 | 11 |

| Present State | Data Bits | (a)(2,16,2) NRZ Code Symbols | (b)(0,7;1,8) NRZ Code Symbols | Next State |
|---|---|---|---|---|
| 6 | 0000 | 0000000001 | 00000 | 13 |
| 6 | 0001 | 0000000001 | 00000 | 14 |
| 6 | 0010 | 0000000001 | 00000 | 15 |
| 6 | 0011 | 0000000001 | 00000 | 16 |
| 6 | 0100 | 0000000000 | 00000 | 1 |
| 6 | 0101 | 0000000000 | 00000 | 2 |
| 6 | 0110 | 0000000000 | 00000 | 3 |
| 6 | 0111 | 0000000001 | 00000 | 12 |
| 6 | 1000 | 0000000000 | 00000 | 18 |
| 6 | 1001 | 0000000000 | 00000 | 19 |
| 6 | 1010 | 0000000000 | 00000 | 20 |
| 6 | 1011 | 0000000001 | 00000 | 21 |
| 6 | 1100 | 0000000000 | 00000 | 4 |
| 6 | 1101 | 0000000000 | 00000 | 5 |
| 6 | 1110 | 0000000000 | 00000 | 22 |
| 6 | 1111 | 0000000000 | 00000 | 23 |

FIG. 6C

| Present State | Data Bits | (a)(2,16,2) NRZ Code Symbols | (b)(0,7;1,8) NRZ Code Symbols | Next State |
|---|---|---|---|---|
| 7 | 0000 | 0000011111 | 00011 | 1 |
| 7 | 0001 | 0000011111 | 00011 | 2 |
| 7 | 0010 | 0000011111 | 00011 | 3 |
| 7 | 0011 | 0000011111 | 00011 | 4 |
| 7 | 0100 | 0000011111 | 00011 | 13 |
| 7 | 0101 | 0000011111 | 00011 | 14 |
| 7 | 0110 | 0000011111 | 00011 | 15 |
| 7 | 0111 | 0000011111 | 00011 | 16 |
| 7 | 1000 | 0000011111 | 00011 | 5 |
| 7 | 1001 | 0000011111 | 00011 | 6 |
| 7 | 1010 | 0000011111 | 00011 | 7 |
| 7 | 1011 | 0000011111 | 00011 | 12 |
| 7 | 1100 | 0000000001 | 00000 | 8 |
| 7 | 1101 | 0000000001 | 00000 | 9 |
| 7 | 1110 | 0000000001 | 00000 | 10 |
| 7 | 1111 | 0000000001 | 00000 | 11 |

| Present State | Data Bits | (a)(2,16,2) NRZ Code Symbols | (b)(0,7;1,8) NRZ Code Symbols | Next State |
|---|---|---|---|---|
| 8 | 0000 | 1100000111 | 10001 | 8 |
| 8 | 0001 | 1100000111 | 10001 | 9 |
| 8 | 0010 | 1100000111 | 10001 | 10 |
| 8 | 0011 | 1100000111 | 10001 | 11 |
| 8 | 0100 | 1100000111 | 10001 | 13 |
| 8 | 0101 | 1100000111 | 10001 | 14 |
| 8 | 0110 | 1100000111 | 10001 | 15 |
| 8 | 0111 | 1100000111 | 10001 | 16 |
| 8 | 1000 | 1100000111 | 10001 | 1 |
| 8 | 1001 | 1100000111 | 10001 | 2 |
| 8 | 1010 | 1100000111 | 10001 | 3 |
| 8 | 1011 | 1100000111 | 10001 | 12 |
| 8 | 1100 | 1100000111 | 10001 | 4 |
| 8 | 1101 | 1100000111 | 10001 | 5 |
| 8 | 1110 | 1100000111 | 10001 | 6 |
| 8 | 1111 | 1100000111 | 10001 | 7 |

FIG. 6D

| Present State | Data Bits | (a)(2,16,2) NRZ Code Symbols | (b)(0,7;1,8) NRZ Code Symbols | Next State |
|---|---|---|---|---|
| 10 | 0000 | 1100011100 | 10010 | 1 |
| 10 | 0001 | 1100011100 | 10010 | 2 |
| 10 | 0010 | 1100011100 | 10010 | 3 |
| 10 | 0011 | 1100011100 | 10010 | 17 |
| 10 | 0100 | 1100011100 | 10010 | 4 |
| 10 | 0101 | 1100011100 | 10010 | 18 |
| 10 | 0110 | 1100011100 | 10010 | 19 |
| 10 | 0111 | 1100011100 | 10010 | 20 |
| 10 | 1000 | 1100011100 | 10010 | 5 |
| 10 | 1001 | 1100011100 | 10010 | 21 |
| 10 | 1010 | 1100011100 | 10010 | 22 |
| 10 | 1011 | 1100011100 | 10010 | 23 |
| 10 | 1100 | 1100000001 | 100000 | 8 |
| 10 | 1101 | 1100000001 | 100000 | 9 |
| 10 | 1110 | 1100000001 | 100000 | 10 |
| 10 | 1111 | 1100000001 | 100000 | 11 |

| Present State | Data Bits | (a)(2,16,2) NRZ Code Symbols | (b)(0,7;1,8) NRZ Code Symbols | Next State |
|---|---|---|---|---|
| 9 | 0000 | 1100000001 | 10000 | 13 |
| 9 | 0001 | 1100000001 | 10000 | 14 |
| 9 | 0010 | 1100000001 | 10000 | 15 |
| 9 | 0011 | 1100000001 | 10000 | 16 |
| 9 | 0100 | 1100000000 | 10000 | 1 |
| 9 | 0101 | 1100000000 | 10000 | 2 |
| 9 | 0110 | 1100000000 | 10000 | 3 |
| 9 | 0111 | 1100000001 | 10000 | 12 |
| 9 | 1000 | 1100000000 | 10000 | 18 |
| 9 | 1001 | 1100000000 | 10000 | 19 |
| 9 | 1010 | 1100000000 | 10000 | 20 |
| 9 | 1011 | 1100000000 | 10000 | 21 |
| 9 | 1100 | 1100000000 | 10000 | 4 |
| 9 | 1101 | 1100000000 | 10000 | 5 |
| 9 | 1110 | 1100000000 | 10000 | 22 |
| 9 | 1111 | 1100000000 | 10000 | 23 |

FIG. 6E

| Present State | Data Bits | (a)(2,16,2) NRZ Code Symbols | (b)(0,7;1,8) NRZ Code Symbols | Next State |
|---|---|---|---|---|
| 11 | 0000 | 110001111 | 10011 | 8 |
| 11 | 0001 | 110001111 | 10011 | 9 |
| 11 | 0010 | 110001111 | 10011 | 10 |
| 11 | 0011 | 110001111 | 10011 | 11 |
| 11 | 0100 | 110001111 | 10011 | 1 |
| 11 | 0101 | 110001111 | 10011 | 2 |
| 11 | 0110 | 110001111 | 10011 | 3 |
| 11 | 0111 | 110001111 | 10011 | 4 |
| 11 | 1000 | 110001111 | 10011 | 13 |
| 11 | 1001 | 110001111 | 10011 | 14 |
| 11 | 1010 | 110001111 | 10011 | 15 |
| 11 | 1011 | 110001111 | 10011 | 16 |
| 11 | 1100 | 110001111 | 10011 | 5 |
| 11 | 1101 | 110001111 | 10011 | 6 |
| 11 | 1110 | 110001111 | 10011 | 7 |
| 11 | 1111 | 110001111 | 10011 | 12 |

| Present State | Data Bits | (a)(2,16,2) NRZ Code Symbols | (b)(0,7;1,8) NRZ Code Symbols | Next State |
|---|---|---|---|---|
| 12 | 0000 | 111100011 | 11001 | 8 |
| 12 | 0001 | 111100011 | 11001 | 9 |
| 12 | 0010 | 111100011 | 11001 | 10 |
| 12 | 0011 | 111100011 | 11001 | 11 |
| 12 | 0100 | 111100011 | 11001 | 13 |
| 12 | 0101 | 111100011 | 11001 | 14 |
| 12 | 0110 | 111100011 | 11001 | 15 |
| 12 | 0111 | 111100011 | 11001 | 16 |
| 12 | 1000 | 111100011 | 11001 | 1 |
| 12 | 1001 | 111100011 | 11001 | 2 |
| 12 | 1010 | 111100011 | 11001 | 3 |
| 12 | 1011 | 111100011 | 11001 | 12 |
| 12 | 1100 | 111100011 | 11001 | 4 |
| 12 | 1101 | 111100011 | 11001 | 5 |
| 12 | 1110 | 111100011 | 11001 | 6 |
| 12 | 1111 | 111100011 | 11001 | 7 |

FIG. 6F

| Present State | Data Bits | (a)(2,16,2) NRZ Code Symbols | (b)(0,7;1,8) NRZ Code Symbols | Next State |
|---|---|---|---|---|
| 13 | 0000 | 1111000001 | 11000 | 13 |
| 13 | 0001 | 1111000001 | 11000 | 14 |
| 13 | 0010 | 1111000001 | 11000 | 15 |
| 13 | 0011 | 1111000001 | 11000 | 16 |
| 13 | 0100 | 1111000000 | 11000 | 1 |
| 13 | 0101 | 1111000000 | 11000 | 2 |
| 13 | 0110 | 1111000000 | 11000 | 3 |
| 13 | 0111 | 1111000001 | 11000 | 12 |
| 13 | 1000 | 1111000000 | 11000 | 18 |
| 13 | 1001 | 1111000000 | 11000 | 19 |
| 13 | 1010 | 1111000000 | 11000 | 20 |
| 13 | 1011 | 1111000000 | 11000 | 21 |
| 13 | 1100 | 1111000000 | 11000 | 4 |
| 13 | 1101 | 1111000000 | 11000 | 5 |
| 13 | 1110 | 1111000000 | 11000 | 22 |
| 13 | 1111 | 1111000000 | 11000 | 23 |

| Present State | Data Bits | (a)(2,16,2) NRZ Code Symbols | (b)(0,7;1,8) NRZ Code Symbols | Next State |
|---|---|---|---|---|
| 14 | 0000 | 1111111100 | 11110 | 1 |
| 14 | 0001 | 1111111100 | 11110 | 2 |
| 14 | 0010 | 1111111100 | 11110 | 3 |
| 14 | 0011 | 1111111100 | 11110 | 17 |
| 14 | 0100 | 1111111100 | 11110 | 4 |
| 14 | 0101 | 1111111100 | 11110 | 18 |
| 14 | 0110 | 1111111100 | 11110 | 19 |
| 14 | 0111 | 1111111100 | 11110 | 20 |
| 14 | 1000 | 1111111100 | 11110 | 5 |
| 14 | 1001 | 1111111100 | 11110 | 21 |
| 14 | 1010 | 1111111100 | 11110 | 22 |
| 14 | 1011 | 1111111100 | 11110 | 23 |
| 14 | 1100 | 1111000001 | 11000 | 8 |
| 14 | 1101 | 1111000001 | 11000 | 9 |
| 14 | 1110 | 1111000001 | 11000 | 10 |
| 14 | 1111 | 1111000001 | 11000 | 11 |

FIG. 6G

| Present State | Data Bits | (a)(2,16,2) NRZ Code Symbols | (b)(0,7;1,8) NRZ Code Symbols | Next State |
|---|---|---|---|---|
| 15 | 0000 | 1111110000 | 11100 | 17 |
| 15 | 0001 | 1111110000 | 11100 | 18 |
| 15 | 0010 | 1111110000 | 11100 | 19 |
| 15 | 0011 | 1111110000 | 11100 | 20 |
| 15 | 0100 | 1111110000 | 11100 | 4 |
| 15 | 0101 | 1111110000 | 11100 | 5 |
| 15 | 0110 | 1111110000 | 11100 | 22 |
| 15 | 0111 | 1111110000 | 11100 | 23 |
| 15 | 1000 | 1111110000 | 11100 | 1 |
| 15 | 1001 | 1111110000 | 11100 | 2 |
| 15 | 1010 | 1111110000 | 11100 | 3 |
| 15 | 1011 | 1111110000 | 11100 | 21 |
| 15 | 1100 | 1111110001 | 11100 | 8 |
| 15 | 1101 | 1111110001 | 11100 | 9 |
| 15 | 1110 | 1111110001 | 11100 | 10 |
| 15 | 1111 | 1111110001 | 11100 | 11 |

| Present State | Data Bits | (a)(2,16,2) NRZ Code Symbols | (b)(0,7;1,8) NRZ Code Symbols | Next State |
|---|---|---|---|---|
| 16 | 0000 | 1111111111 | 11111 | 8 |
| 16 | 0001 | 1111111111 | 11111 | 9 |
| 16 | 0010 | 1111111111 | 11111 | 10 |
| 16 | 0011 | 1111111111 | 11111 | 11 |
| 16 | 0100 | 1111111111 | 11111 | 1 |
| 16 | 0101 | 1111111111 | 11111 | 2 |
| 16 | 0110 | 1111111111 | 11111 | 3 |
| 16 | 0111 | 1111111111 | 11111 | 4 |
| 16 | 1000 | 1111110001 | 11100 | 13 |
| 16 | 1001 | 1111110001 | 11100 | 14 |
| 16 | 1010 | 1111110001 | 11100 | 15 |
| 16 | 1011 | 1111111111 | 11111 | 5 |
| 16 | 1100 | 1111111111 | 11111 | 6 |
| 16 | 1101 | 1111111111 | 11111 | 7 |
| 16 | 1110 | 1111111111 | 11111 | 7 |
| 16 | 1111 | 1111110001 | 11100 | 12 |

FIG. 6H

| Present State | Data Bits | (a)(2,16,2) NRZ Code Symbols | (b)(0,7;1,8) NRZ Code Symbols | Next State |
|---|---|---|---|---|
| 17 | 0000 | 0000000001 | 00000 | 13 |
| 17 | 0001 | 0000000001 | 00000 | 14 |
| 17 | 0010 | 0000000001 | 00000 | 15 |
| 17 | 0011 | 0000000001 | 00000 | 16 |
| 17 | 0100 | 0000000000 | 00000 | 1 |
| 17 | 0101 | 0000000000 | 00000 | 2 |
| 17 | 0110 | 0000000000 | 00000 | 3 |
| 17 | 0111 | 0000000001 | 00000 | 12 |
| 17 | 1000 | 0000000000 | 00000 | 18 |
| 17 | 1001 | 0000000000 | 00000 | 19 |
| 17 | 1010 | 0000000000 | 00000 | 20 |
| 17 | 1011 | 0000000000 | 00000 | 21 |
| 17 | 1100 | 0000000001 | 00000 | 8 |
| 17 | 1101 | 0000000001 | 00000 | 9 |
| 17 | 1110 | 0000000001 | 00000 | 10 |
| 17 | 1111 | 0000000001 | 00000 | 11 |

| Present State | Data Bits | (a)(2,16,2) NRZ Code Symbols | (b)(0,7;1,8) NRZ Code Symbols | Next State |
|---|---|---|---|---|
| 18 | 0000 | 0111111111 | 01111 | 13 |
| 18 | 0001 | 0111111111 | 01111 | 14 |
| 18 | 0010 | 0111111111 | 01111 | 15 |
| 18 | 0011 | 0111111111 | 01111 | 12 |
| 18 | 0100 | 0111110000 | 01100 | 17 |
| 18 | 0101 | 0111110000 | 01100 | 18 |
| 18 | 0110 | 0111110000 | 01100 | 19 |
| 18 | 0111 | 0111110000 | 01100 | 20 |
| 18 | 1000 | 0111110000 | 01100 | 4 |
| 18 | 1001 | 0111110000 | 01100 | 5 |
| 18 | 1010 | 0111110000 | 01100 | 22 |
| 18 | 1011 | 0111110000 | 01100 | 23 |
| 18 | 1100 | 0111110000 | 01100 | 1 |
| 18 | 1101 | 0111110000 | 01100 | 2 |
| 18 | 1110 | 0111110000 | 01100 | 3 |
| 18 | 1111 | 0111110000 | 01100 | 21 |

FIG. 6I

| Present State | Data Bits | (a)(2,16,2) NRZ Code Symbols | (b)(0,7;1,8) NRZ Code Symbols | Next State |
|---|---|---|---|---|
| 19 | 0000 | 0111111111 | 01111 | 8 |
| 19 | 0001 | 0111111111 | 01111 | 9 |
| 19 | 0010 | 0111111111 | 01111 | 10 |
| 19 | 0011 | 0111111111 | 01111 | 11 |
| 19 | 0100 | 0111111111 | 01111 | 1 |
| 19 | 0101 | 0111111111 | 01111 | 2 |
| 19 | 0110 | 0111111111 | 01111 | 3 |
| 19 | 0111 | 0111111111 | 01111 | 4 |
| 19 | 1000 | 0111110001 | 01100 | 13 |
| 19 | 1001 | 0111110001 | 01100 | 14 |
| 19 | 1010 | 0111110001 | 01100 | 15 |
| 19 | 1011 | 0111110001 | 01100 | 16 |
| 19 | 1100 | 0111111111 | 01111 | 5 |
| 19 | 1101 | 0111111111 | 01111 | 6 |
| 19 | 1110 | 0111111111 | 01111 | 7 |
| 19 | 1111 | 0111110001 | 01100 | 12 |

| Present State | Data Bits | (a)(2,16,2) NRZ Code Symbols | (b)(0,7;1,8) NRZ Code Symbols | Next State |
|---|---|---|---|---|
| 20 | 0000 | 0111111100 | 01110 | 1 |
| 20 | 0001 | 0111111100 | 01110 | 2 |
| 20 | 0010 | 0111111100 | 01110 | 3 |
| 20 | 0011 | 0111111100 | 01110 | 17 |
| 20 | 0100 | 0111111100 | 01110 | 4 |
| 20 | 0101 | 0111111100 | 01110 | 18 |
| 20 | 0110 | 0111111100 | 01110 | 19 |
| 20 | 0111 | 0111111100 | 01110 | 20 |
| 20 | 1000 | 0111111100 | 01110 | 5 |
| 20 | 1001 | 0111111100 | 01110 | 21 |
| 20 | 1010 | 0111111100 | 01110 | 22 |
| 20 | 1011 | 0111111100 | 01110 | 23 |
| 20 | 1100 | 0111110001 | 01100 | 8 |
| 20 | 1101 | 0111110001 | 01100 | 9 |
| 20 | 1110 | 0111110001 | 01100 | 10 |
| 20 | 1111 | 0111110001 | 01100 | 11 |

FIG. 6J

| Present State | Data Bits | (a)(2,16,2) NRZ Code Symbols | (b)(0,7;1,8) NRZ Code Symbols | Next State |
|---|---|---|---|---|
| 21 | 0000 | 0111000111 | 01001 | 8 |
| 21 | 0001 | 0111000111 | 01001 | 9 |
| 21 | 0010 | 0111000111 | 01001 | 10 |
| 21 | 0011 | 0111000111 | 01001 | 11 |
| 21 | 0100 | 0111000111 | 01001 | 13 |
| 21 | 0101 | 0111000111 | 01001 | 14 |
| 21 | 0110 | 0111000111 | 01001 | 15 |
| 21 | 0111 | 0111000111 | 01001 | 16 |
| 21 | 1000 | 0111000111 | 01001 | 1 |
| 21 | 1001 | 0111000111 | 01001 | 2 |
| 21 | 1010 | 0111000111 | 01001 | 3 |
| 21 | 1011 | 0111000111 | 01001 | 12 |
| 21 | 1100 | 0111000111 | 01001 | 4 |
| 21 | 1101 | 0111000111 | 01001 | 5 |
| 21 | 1110 | 0111000111 | 01001 | 6 |
| 21 | 1111 | 0111000111 | 01001 | 7 |

| Present State | Data Bits | (a)(2,16,2) NRZ Code Symbols | (b)(0,7;1,8) NRZ Code Symbols | Next State |
|---|---|---|---|---|
| 22 | 0000 | 0111000001 | 01000 | 13 |
| 22 | 0001 | 0111000001 | 01000 | 14 |
| 22 | 0010 | 0111000001 | 01000 | 15 |
| 22 | 0011 | 0111000001 | 01000 | 16 |
| 22 | 0100 | 0111000000 | 01000 | 1 |
| 22 | 0101 | 0111000000 | 01000 | 2 |
| 22 | 0110 | 0111000000 | 01000 | 3 |
| 22 | 0111 | 0111100001 | 01000 | 12 |
| 22 | 1000 | 0111000000 | 01000 | 18 |
| 22 | 1001 | 0111000000 | 01000 | 19 |
| 22 | 1010 | 0111000000 | 01000 | 20 |
| 22 | 1011 | 0111000000 | 01000 | 21 |
| 22 | 1100 | 0111000000 | 01000 | 4 |
| 22 | 1101 | 0111000000 | 01000 | 5 |
| 22 | 1110 | 0111000000 | 01000 | 22 |
| 22 | 1111 | 0111000000 | 01000 | 23 |

FIG. 6K

| | | | |
|---|---|---|---|
| FIG. 6A |
| FIG. 6B |
| FIG. 6C |
| FIG. 6D |
| FIG. 6E |
| FIG. 6F |
| FIG. 6G |
| FIG. 6H |
| FIG. 6I |
| FIG. 6J |
| FIG. 6K |
| FIG. 6L |

FIG. 6

| Present State | Data Bits | (a)(2,16,2) NRZ Code Symbols | (b)(0,7;1,8) NRZ Code Symbols | Next State |
|---|---|---|---|---|
| 23 | 0000 | 0000011111 | 00011 | 1 |
| 23 | 0001 | 0000011111 | 00011 | 2 |
| 23 | 0010 | 0000011111 | 00011 | 3 |
| 23 | 0011 | 0000011111 | 00011 | 4 |
| 23 | 0100 | 0000011111 | 00011 | 13 |
| 23 | 0101 | 0000011111 | 00011 | 14 |
| 23 | 0110 | 0000011111 | 00011 | 15 |
| 23 | 0111 | 0000011111 | 00011 | 16 |
| 23 | 1000 | 0000011111 | 00011 | 5 |
| 23 | 1001 | 0000011111 | 00011 | 6 |
| 23 | 1010 | 0000011111 | 00011 | 7 |
| 23 | 1011 | 0000011111 | 00011 | 12 |
| 23 | 1100 | 0111000001 | 01000 | 8 |
| 23 | 1101 | 0111000001 | 01000 | 9 |
| 23 | 1110 | 0111000001 | 01000 | 10 |
| 23 | 1111 | 0111000001 | 01000 | 11 |

FIG. 6L

| FIG. 11A |
|---|
| FIG. 11B |
| FIG. 11C |
| FIG. 11D |

FIG. 11

| j/i | 11 | 10 | 9 | 8 | 7 | 6 | 5 | 4 | 3 | 2 | 1 | 0 |
|---|---|---|---|---|---|---|---|---|---|---|---|---|
| 0 | 0 | — | — | — | — | 0 | — | 0 | 1 | — | — | — |
| 1 | — | — | — | — | — | 0 | 1 | — | 0 | 1 | — | — |
| 2 | 0 | — | — | — | — | 0 | 1 | 0 | — | — | — | — |
| 3 | 0 | — | 0 | 1 | — | 1 | 0 | — | — | — | — | — |
| 4 | 1 | — | — | 1 | — | 1 | 1 | — | — | — | — | — |
| 5 | — | — | 0 | — | 1 | — | 1 | — | 0 | 1 | — | — |
| 6 | 0 | — | — | 0 | — | 0 | — | 0 | — | 1 | — | — |
| 7 | — | — | — | 1 | — | 0 | 1 | 0 | — | — | — | — |
| 8 | — | 0 | 1 | — | — | 1 | 1 | — | — | — | — | — |
| 9 | — | — | — | 1 | — | 0 | — | 0 | 1 | — | — | — |
| 10 | — | 1 | 1 | — | 0 | 1 | — | — | — | — | — | — |
| 11 | — | — | — | 0 | 1 | 0 | — | — | — | — | — | — |
| 12 | — | — | 0 | 0 | 0 | — | 0 | 0 | — | — | — | — |
| 13 | — | — | 0 | 0 | — | 0 | 1 | — | — | — | — | — |
| 14 | — | — | 1 | 0 | — | — | 0 | 1 | — | — | — | — |
| 15 | — | — | — | — | 1 | 0 | — | 0 | — | 0 | — | — | k=3

FIG. 11A

| j/i | 11 | 10 | 9 | 8 | 7 | 6 | 5 | 4 | 3 | 2 | 1 | 0 |
|---|---|---|---|---|---|---|---|---|---|---|---|---|
| 0  | – | – | – | 0 | 1 | – | 1 | – | 1 | – | – | – |
| 1  | 1 | – | – | 1 | – | 1 | 1 | – | 0 | 1 | – | – |
| 2  | 0 | – | – | – | 1 | – | 1 | – | 1 | 1 | – | – |
| 3  | – | 0 | 1 | – | 1 | – | 1 | – | – | – | – | – |
| 4  | 1 | – | – | – | 0 | – | 0 | – | 0 | 1 | – | – |
| 5  | 1 | – | – | 0 | – | 0 | – | 0 | 1 | – | – | – |
| 6  | 0 | – | – | 0 | 0 | – | 0 | – | 0 | 0 | – | – |
| 7  | 0 | – | 1 | 0 | – | – | 1 | – | 0 | 1 | – | – |
| 8  | 0 | 0 | – | – | 1 | – | 1 | – | – | 0 | – | – |
| 9  | 1 | – | – | 1 | 1 | 0 | – | – | – | – | – | – |
| 10 | – | – | – | – | 0 | 1 | 0 | – | – | – | – | – |
| 11 | – | – | – | 0 | 1 | 0 | – | 0 | – | – | – | – |
| 12 | – | 1 | – | 1 | 1 | 0 | – | – | – | – | – | – |
| 13 | 0 | – | 1 | 0 | – | 0 | – | 1 | – | – | – | – |
| 14 | – | – | – | 1 | – | 0 | 1 | 1 | – | – | – | – |
| 15 | – | – | – | – | 0 | 1 | – | 0 | – | 1 | – | – |
| 16 | – | – | 0 | 0 | 0 | – | 0 | – | – | – | – | – |
| 17 | 0 | – | 0 | 1 | – | 1 | 0 | – | – | – | – | – |
| 18 | – | – | 1 | – | 1 | 0 | – | 0 | 1 | – | – | – |
| 19 | – | – | – | 0 | 1 | – | 1 | – | – | 0 | – | – |
| 20 | – | – | 1 | – | 1 | 0 | – | 0 | – | 0 | – | – |
| 21 | – | – | – | 1 | 0 | – | 0 | – | 0 | 1 | – | – |
| 22 | 1 | – | – | 0 | – | 0 | 1 | 0 | – | 0 | – | – |
| 23 | – | – | 0 | 0 | – | 0 | – | 0 | – | 0 | – | – | k=2

FIG. 11B

| j/i | 11 | 10 | 9 | 8 | 7 | 6 | 5 | 4 | 3 | 2 | 1 | 0 |
|---|---|---|---|---|---|---|---|---|---|---|---|---|
| 0 | — | — | — | 1 | — | — | 1 | — | 1 | 1 | — | 0 |
| 1 | — | — | 1 | — | — | — | — | 1 | — | 0 | 1 | — |
| 2 | — | — | — | — | 1 | — | 0 | — | — | 0 | 1 | 0 |
| 3 | — | — | — | 1 | — | — | — | 1 | — | 0 | 1 | — |
| 4 | — | — | 1 | — | — | — | 1 | — | 1 | 1 | — | 0 |
| 5 | — | — | — | 0 | 1 | 0 | — | 0 | 0 | 0 | — | — |
| 6 | — | — | — | — | — | — | — | 0 | 1 | — | 1 | 1 |
| 7 | — | — | — | — | — | 1 | 1 | — | 0 | 1 | — | — |
| 8 | — | — | — | — | — | — | 0 | 1 | — | 0 | 1 | — |
| 9 | — | — | — | — | — | — | 0 | — | 1 | 1 | 0 | — |
| 10 | — | — | — | 0 | — | 0 | 1 | 0 | — | — | — | — |
| 11 | — | — | — | — | — | — | — | 1 | — | 0 | 1 | 0 |
| 12 | — | — | — | — | — | 1 | — | 0 | 1 | — | — | — |
| 13 | — | — | — | — | — | 1 | 1 | — | — | 1 | — | — |
| 14 | — | — | — | — | — | 1 | — | 1 | 0 | — | — | — |
| 15 | — | — | — | — | — | 0 | 1 | — | 1 | 0 | — | — |
| 16 | — | — | — | 1 | 0 | — | — | 0 | 0 | 0 | — | — |
| 17 | — | — | — | — | — | 1 | 0 | — | — | 0 | 1 | 0 | k=1

FIG. 11C

| j/i | 11 | 10 | 9 | 8 | 7 | 6 | 5 | 4 | 3 | 2 | 1 | 0 |
|---|---|---|---|---|---|---|---|---|---|---|---|---|
| 0 | – | – | – | 1 | – | – | 1 | – | – | 1 | – | 1 |
| 1 | – | – | – | 0 | 1 | 0 | – | 0 | – | 0 | 1 | 0 |
| 2 | – | – | – | 1 | – | 0 | 1 | – | – | 0 | 1 | 0 |
| 3 | – | – | 0 | 0 | – | – | 1 | – | – | 1 | – | 0 |
| 4 | – | – | – | – | 0 | – | – | 0 | 1 | – | 1 | 1 |
| 5 | – | – | 0 | 0 | – | – | 1 | 1 | – | 0 | 1 | 1 |
| 6 | – | – | 1 | – | – | – | 1 | – | – | 1 | – | 1 |
| 7 | – | – | – | – | – | 1 | 0 | – | – | 0 | 1 | 1 |
| 8 | – | – | – | 1 | – | 0 | 1 | 1 | – | 0 | 0 | – |
| 9 | – | – | – | 1 | 0 | – | – | 0 | – | 0 | 1 | 0 |
| 10 | – | – | 1 | – | – | 0 | 1 | – | – | 0 | 1 | 0 |
| 11 | – | – | – | 1 | – | – | 0 | 0 | – | 0 | 1 | 1 |
| 12 | – | – | – | – | – | – | 0 | 1 | – | 1 | 1 | 0 |
| 13 | – | – | – | – | – | 1 | – | 1 | 1 | – | – | – |
| 14 | – | – | – | – | – | – | 0 | 1 | 0 | – | 0 | – |
| 15 | – | – | 1 | – | – | 0 | 1 | 1 | – | 0 | 0 | – |
| 16 | – | – | – | 1 | – | – | 0 | – | 0 | 0 | 0 | – |
| 17 | – | – | – | – | – | – | 1 | – | 0 | 1 | – | – |
| 18 | – | – | – | – | – | 1 | – | – | 1 | 1 | – | – |
| 19 | – | – | – | – | – | 1 | – | 1 | – | – | 1 | 1 |
| 20 | – | – | – | 1 | 1 | 0 | – | – | 0 | 1 | – | – |
| 21 | – | – | – | – | – | – | 1 | 0 | – | – | 1 | 0 |
| 22 | – | – | – | 0 | – | 0 | – | 0 | 1 | – | – | – |
| 23 | – | – | – | – | 0 | – | – | 0 | 1 | 1 | 0 | – |
| 24 | – | – | – | – | – | 1 | 0 | – | 0 | 0 | 0 | – | k=0

FIG. 11D

HIGH CAPACITY RUN-LENGTH-LIMITED CODING SYSTEM EMPLOYING ASYMMETRIC AND EVEN-SPACED CODES

BACKGROUND OF THE INVENTION

1. Field of the Invention

This invention relates generally to run-length-limited (RLL) codes permitting high-density recording in optical and magnetic storage media and, more specifically, to a system for transforming between a high rate 2 M/N asymmetric RLL code and a rate M/N evenspaced RLL code suitable for use with magnetic and magneto-optical recording.

2. Description of the Related Art

In many digital magnetic recording systems, digital data is represented by flux transitions positioned within discrete time intervals between either of two possible states of magnetization in a recording medium. It is convenient to represent patterns of such flux transitions as binary sequences in which the presence or absence of a transition within a code symbol clock interval is indicated by a first or second code symbol such as "1" or "0", respectively. The physical necessity of limiting the minimum and maximum spacing between flux transitions in the medium is expressed in the two run-length constraints (d, k) on the binary sequences, which respectively designate the minimum and maximum number of second code symbols "0" occurring between successive first codes symbols ("0"). A set of rules for mapping M arbitrary user data bit sequences into N bits of a constrained code sequence is herein denominated a run-length-limited (RLL) code of rate M/N.

Even-spaced RLL codes having an even-consecutive-zero constraint in addition to the usual (d, k) run length constraints were first proposed by Paul Funk ("Run-Length-Limited Codes with Multiple Spacing", IEEE Trans. Magnetics, Vol. Mag-18, No. 2, pp. 772–775, March 1982) and are herein denominated as (d, k, 2) or (2d, 2k, 2) RLL codes. Funk observed that multiple-spaced codes are disadvantaged by the potentially infinite propagation of symbol detection errors but showed for the special case of even-spacing that this infinite detection-error propagation can be eliminated through the use of a transition-polarity detection scheme. Also, in U.S. Pat. No. 4,928,187, Rees describes a rate 1/3 (2, 8, 2) RLL code with features similar to those of the 1/3 rate (2, 8, 2) RLL code discussed by Funk.

D. Rugar et al. ("Recording Results and Coding Considerations for the Resonant Biased Coil Overwrite Technique", Proc. of the Optical Data Storage Topical Meeting in Los Angeles, 1989, SPIE Vol. 1078, pp. 265–270) explore Funk's even-spaced RLL codes for particular application to resonant biased-coil magneto-optical recording techniques. They discuss using rate 1/3 (2, 6, 2) and rate 2/5 (2, 18, 2) even-spaced RLL codes for resonant coil overwriting in magneto-optical data recorders.

The rate 2/5 (2, 18, 2) RLL code was found to be superior to the rate 2/3 (1, 7), rate 1/2 (2, 7), and rate 1/3 (2, 8, 2) RLL codes when used for pulse-width modulation (PWM) recording with either maximum slope or threshold detection channels and also was found to be superior to all other known RLL codes for optical partial response maximum likelihood (PRML) type data channels, including the rate 2/3 (1, 7) RLL code at linear densities above 45 kbpi. Such even-spaced codes thus appear ideal for magneto-optical applications.

In U.S. Pat. No. 5,173,694, entirely incorporated herein by this reference, R. T. Lynch, Jr. et al. disclose a practical method for encoding and decoding a rate 2/5 (2, 18, 2) RLL code. Their encoding and decoding technique was developed using the state-splitting algorithm of Adler et al. (IEEE Trans. Information Theory, Vol. IT-29, pp. 5–22, January 1983), the preliminary merging technique of Marcus et al. ("Finite-State Codes for Data Storage", IBM RJ8291, August 1991) and a "code word reassignment" technique disclosed in their patent.

Using similar code construction methods, it was later found that a rate 2/5 (2, 16, 2) even-spaced RLL code could be similarly constructed having less than 0.7 percent excess capacity without additional complexity. The maximum theoretical rate of a (2, 16, 2) code is 0.40274, so the 2/5 rate is 99.3 percent efficient. Rate 2/5 (2, 16, 2) even-spaced RLL codes are well-suited for magneto-optic recording systems incorporating resonant-biased coil direct overwrite techniques and also are applicable to magnetic recording systems where RLL codes are used. The even-spaced property of the code provides a wider detection window than is available with the standard RLL codes, which ensures improved channel performance. The wider detection window affects the sliding block decoder used to recover original bit data from the recorded code symbols.

Table 1 shows the relative performance of several single-spaced and double-spaced RLL codes proposed for magneto-optic data recording, assuming an original user bit data rate of 40 MHz.

TABLE 1

| STORAGE CODE PARAMETERS FOR A 40 M BIT/SEC USER RATE | | | | | |
|---|---|---|---|---|---|
| CODE CONSTRAINT | CODE RATE | SLIDING DECODER WINDOW | MINIMUM TRANSITION SPACING | CODE SYMBOL CLOCK RATE | CODE RATE EFFICIENCY |
| (2, 7) | 1/2 | 12.5 ns | 37.5 ns | 80 MHz | 96.7% |
| (1, 7) | 2/3 | 16.6 ns | 33.3 ns | 60 MHz | 98.2% |
| (2, 18, 2) | 2/5 | 20.0 ns | 30.0 ns | 100 MHz | 99.0% |
| (2, 16, 2) | 2/5 | 20.0 ns | 30.0 ns | 100 MHz | 99.3% |

Note that the even-spaced RLL codes have wider sliding decoder windows than either single-spaced RLL code. In optical recording, this wider window more than compensates for the somewhat greater inter-symbol interference (ISI). The wide window is also believed to be a favorable feature in DASD systems. Preliminary experiments show that the (2, 16, 2) even-spaced RLL code may provide up to 120 percent of the linear data storage density available from the (1, 7) RLL code.

The primary disadvantage of even-spaced RLL codes is the low code rate, which imposes a high data symbol clock frequency (e.g., 100 MHz). As user bit data rates increase, the elevated clock frequency required for the rate 2/5 (2, 16, 2) RLL code becomes a significant limitation. This limitation can be overcome through the use of higher-rate RLL coding.

Practitioners in the art have proposed higher rate RLL codes to improve linear recording density for data recorded on optical storage media. For instance, in U.S. Pat. No. 4,949,196, entirely incorporated herein by this reference, Neil R. Davie et al. disclose a method and apparatus for applying asymmetrical RLL codes to magnetic and optical data recording devices. The asymmetric RLL code is herein expressed as rate M/N ($d_1, k_1; d_2, k_2$), where N is the number of code symbols required to encode M user data bits, and where the single-spaced RLL constraint alternates between ($d_1, k_1$) and ($d_2, k_2$) at each recorded signal transition. Davie et al. disclose a rate 4/5 (0,10; 1, 11) asymmetric RLL code that is particularly useful because of the very high code rate.

There is a clearly-felt need in the art for a RLL code system that achieves the high code rates of the asymmetric RLL codes while also providing the wide sliding decoder windows and high code rate efficiencies of the even-spaced codes. The related unresolved problems and deficiencies are clearly felt in the art and are solved by this invention in the manner described below.

SUMMARY OF THE INVENTION

This invention is a system for transformation a rate M/N (2d, 2k, 2) even-spaced RLL code to a rate 2M/N (d–1K–1, d, k) asymmetric RLL code and back again using simple signal transition delays. The user bit data is encoded and decoded using the high-rate asymmetric RLL code while the storage medium transition patterns are advantageously arranged according to the even-spaced RLL code with no loss of error rate performance.

It is an object of the system of this invention to overcome the high code symbol clock rate limitation of the even-spaced RLL codes by performing all user bit data coding and decoding operations at a reduced data clock frequency.

It is another object of the system of this invention to provide storage medium transition patterns identical to those obtained using even-spaced RLL codes.

The foregoing, together with other objects, features and advantages of this invention, will become more apparent when referring to the following specification, claims and the accompanying drawing.

BRIEF DESCRIPTION OF THE PREFERRED EMBODIMENTS

For a more complete understanding of this invention, reference is now made to the following detailed description of the embodiments as illustrated in the accompanying drawing, wherein:

FIG. 2 shows a functional block diagram of an illustrative embodiment of a write channel apparatus for storing user data in accordance with the method of this invention;

FIG. 3 shows a functional block diagram of an illustrative embodiment of a read channel apparatus for retrieving user data in accordance with the method of this invention;

FIG. 4 is a table showing a finite state machine for a rate 2/5 (2, 16, 2) RLL encoder;

Figure 7A:
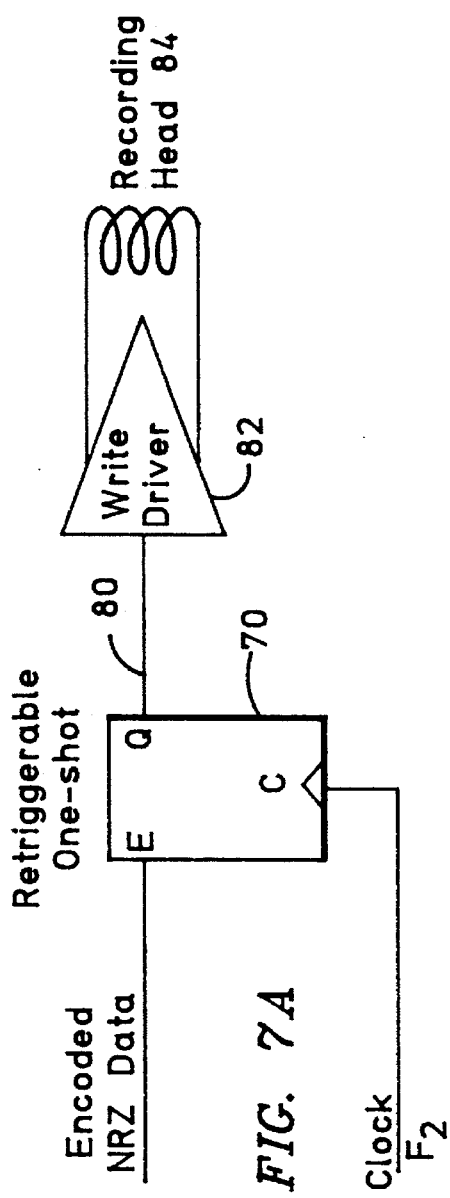
Figure 7B:
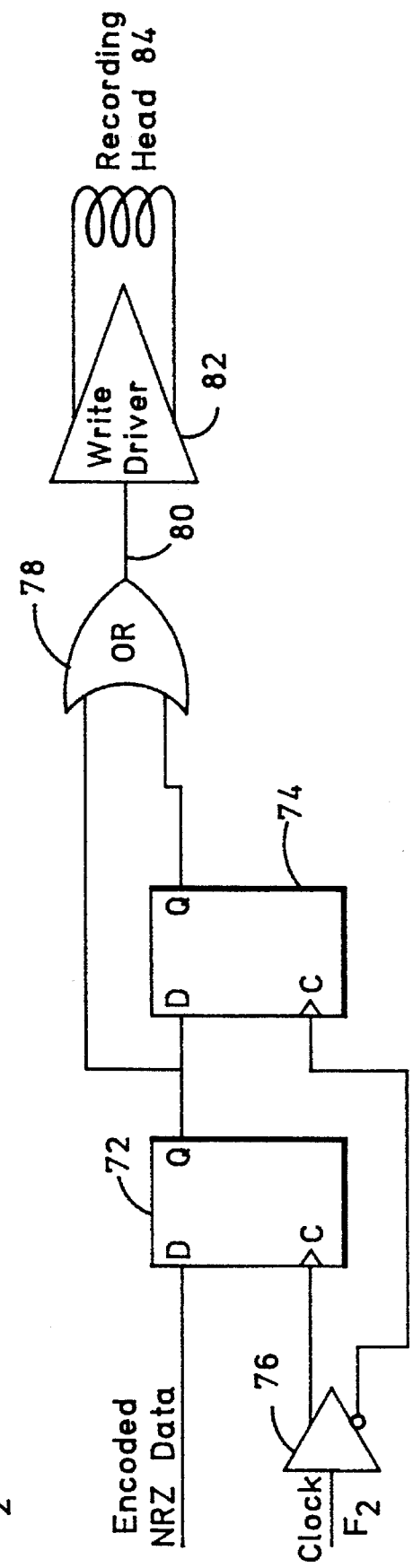
Figure 8:
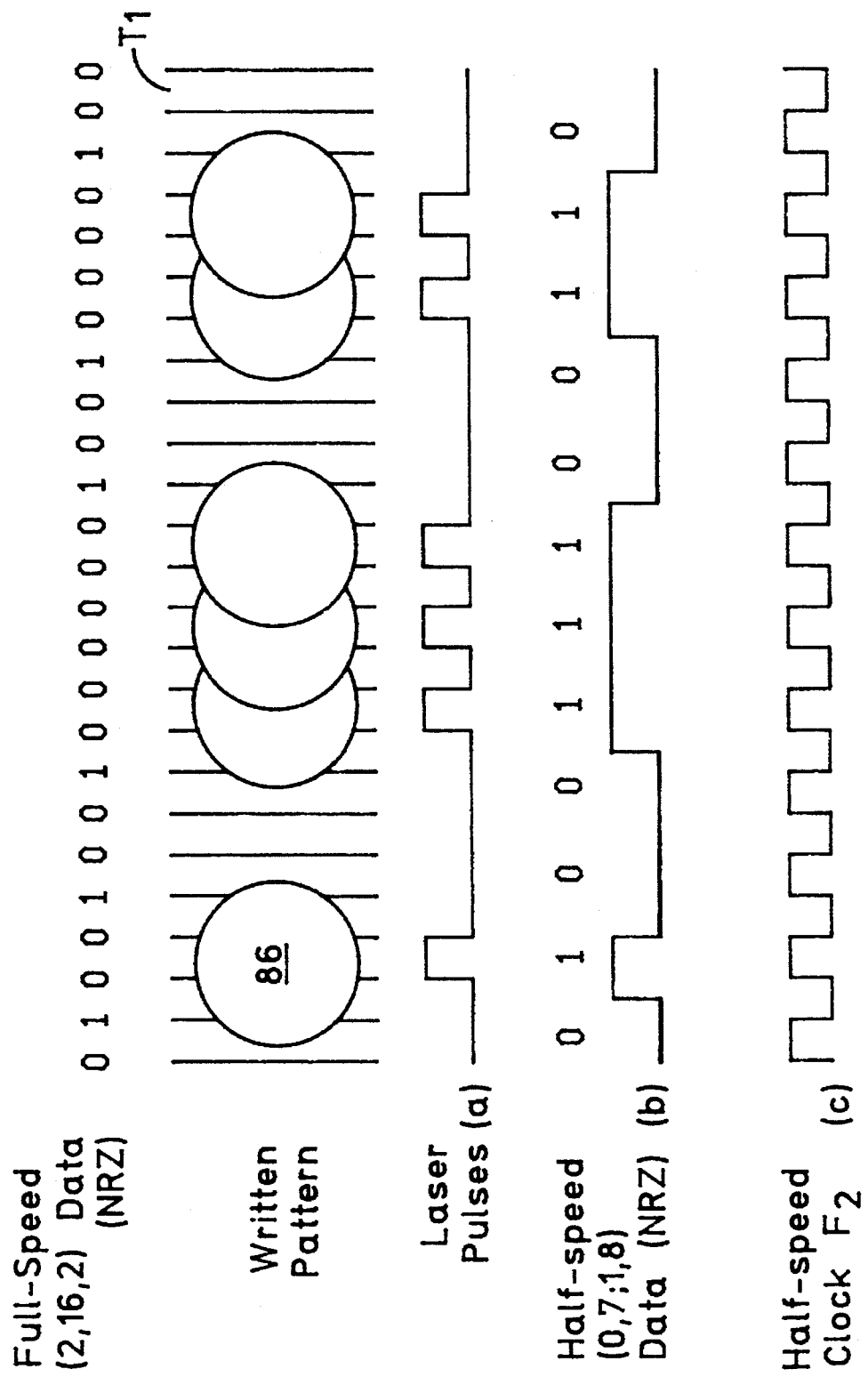
Figure 9:
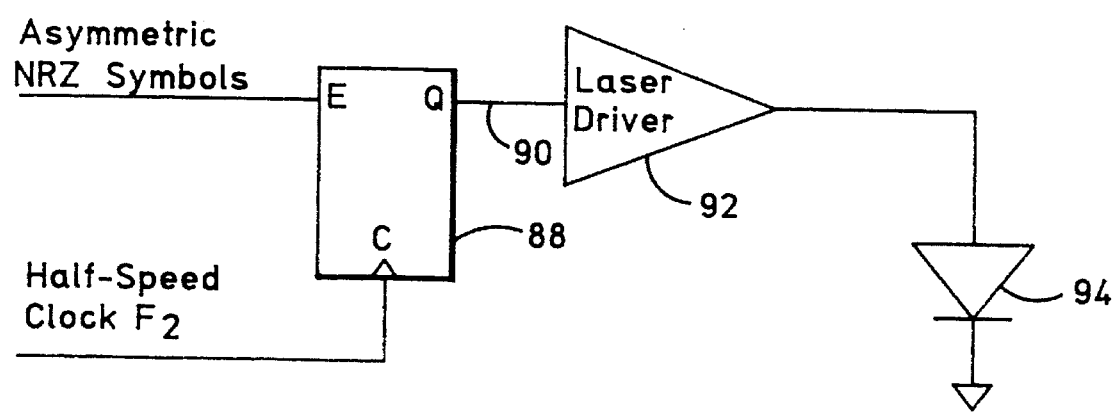
Figure 10:
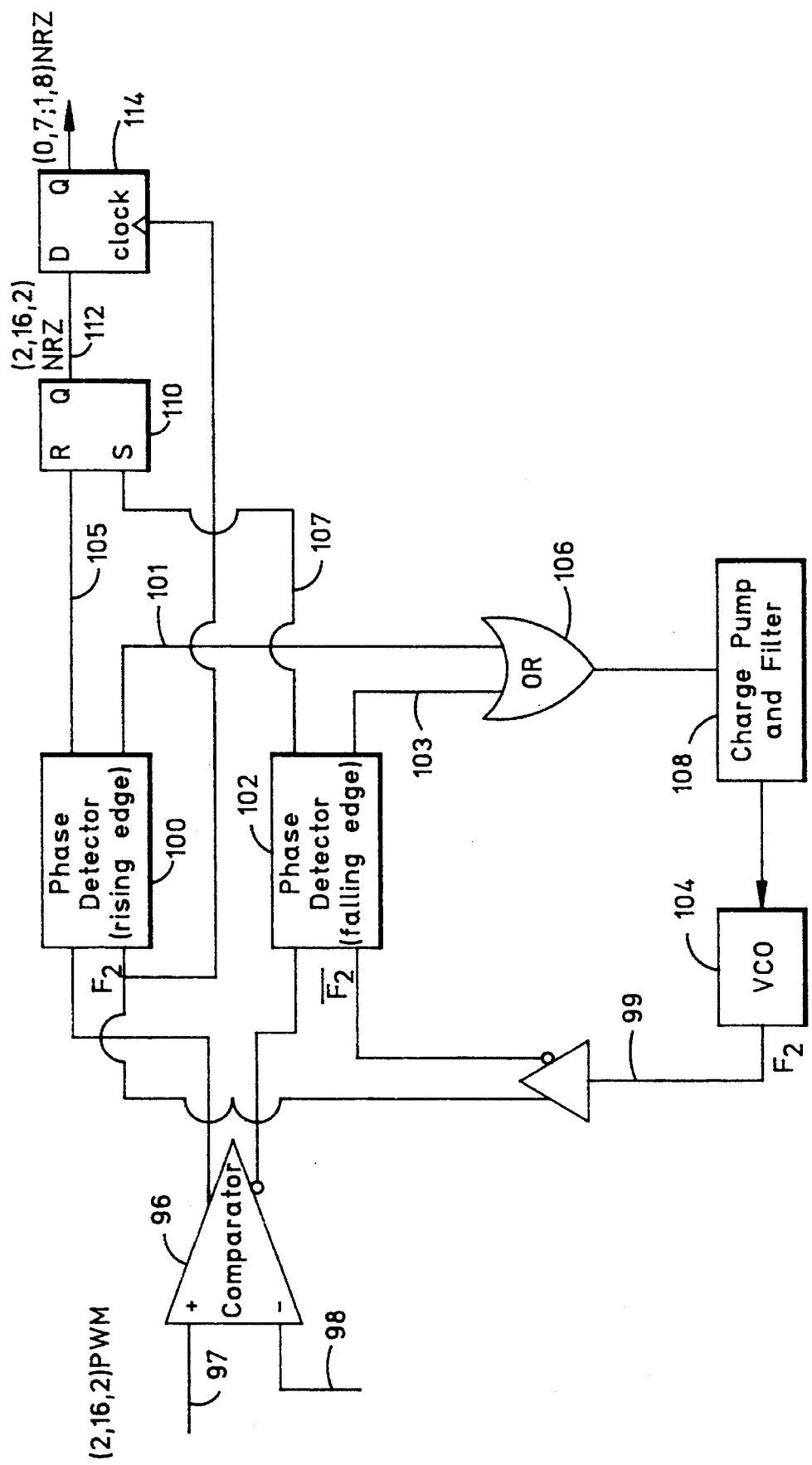

FIG. 6, comprising FIGS. 6A–6L, shows a 23-state finite state machine for NRZ encoding to (2, 16, 2) and (0, 7; 1, 8) RLL codes in accordance with the method of this invention;

FIGS. 7A–7B provide illustrative electronic circuits for converting asymmetrical RLL encoded data to even-spaced RLL coded waveforms in accordance with the method of this invention;

FIG. 8 shows an illustrative method for writing even-spaced RLL code signals to an optical disk using laser pulses driven from asymmetric RLL coded waveforms in accordance with the method of this invention;

FIG. 9 shows an illustrative electronic circuit for generating laser pulses from NRZ encoded data;

FIG. 10 shows an illustrative embodiment of a data synchronizer circuit for converting a rate 2/5 (2, 16, 2) RLL code signal to a rate 4/5 (0, 7; 1, 8) RLL code signal in accordance with the method of this invention; and FIG. 11 comprising FIGS. 11A–11D, is a decoder dictionary for a rate 4/5 (0, 7; 1, 8) asymmetric RLL code using NRZ code symbols.

DETAILED DESCRIPTION OF THE PREFERRED EMBODIMENTS

The (2, 16, 2) Even-Spaced RLL Code

The rate 2/5 (2, 16, 2) RLL encoder can be embodied as a finite-state machine with 23 states, as shown in FIG. 4. The state information can be stored as five bits. From current state information and two input data bits, the encoder generates a 5-bit code word and a 5-bit next-state value. The encoder functions can be implemented as a simple read-only-memory (ROM)-based circuit or as Boolean logic. Because there are many acceptable assignments of 5-bit patterns designating the encoder states and of two-bit input data patterns for the code words at each states, the code table shown in FIG. 4 is merely exemplary.

The rate 2/5 (2, 16, 2) RLL decoder is a sliding block decoder that determines the correct two-bit input data corresponding to the current code word based upon the contents of a window containing the current code word and the subsequent three code words. This decoder function is simplified through the use of code word reassignment, which, is further discussed in the above-cited Lynch et al. patent. With code word reassignment, the eight valid code words of length five are represented by eight three-bit labels. Because the fourword window is then only 12-bits long, the decoder may then be implemented in a 4k by 2 ROM.

The rate 2/5 (2, 16, 2) RLL code provides an improved maximum run length (k) constraint relative to the rate 2/5 (2, 18, 2) RLL code discussed in the above-cited Rugar et al. reference while preserving the 2/5 rate and the single input-bit error propagation limit with slightly reduced complexity and slightly improved coding efficiency. The discussion herein accordingly relies on the (2, 16, 2) RLL code, but could just as well consider the example of the rate 2/5 (2, 18, 2) RLL code in connection with this invention.

Two-Level Waveform Conventions

Figure 1:
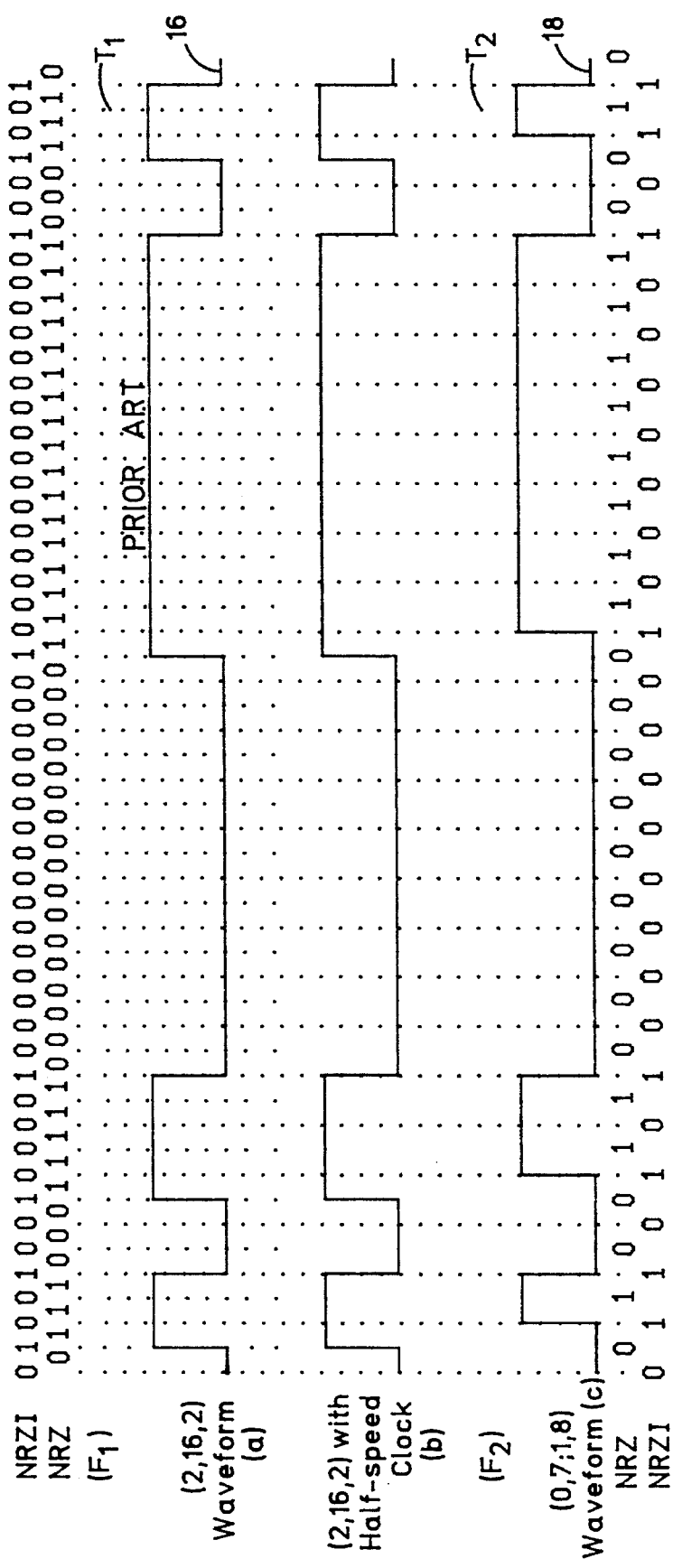
FIG. 1 illustrates the code signal waveform transformation between a rate 2/5 (2, 16, 2) even-spaced RLL code and a rate 4/5 (0, 7; 1, 8) asymmetric RLL code.

A two-level RLL waveform, such as a magnetization pattern on a disk, can be described as a sequence of positive integers representing the number of clock pulses between successive transitions (run length coding). Two equivalent representations are commonly used; Transition Coding (NRZI) and Level Coding (NRZ). In NRZI or transition coding, every signal transition is represented as a binary "1" and the absence of a transition during any single clock period is represented as a binary "0". The integers in a run length coded sequence represent the "0" run length plus one of the NRZ coded transitions. FIG. 1 provides exemplary waveforms 16 and 18 with the equivalent binary code representations. The NRZ Run Length integers for waveform 16 are (3, 3, 5, 17, 17, 3, 3). The NRZI Run Length integers for waveform 16 are (2, 2, 4, 16, 16, 2, 2). Note that the NRZ Run Length integers for waveform 18 are (1, 2, 2, 9, 8, 2, 1) and the NRZI Run Length integers for waveform 18 are (0, 1, 1, 8, 7, 1, 0).

The RLL code parameters (d, k) are always specified in terms of NRZI or transition coding. For example, the (2, 16, 2) NRZI string in FIG. 1 satisfies the (d, k, s)=(2, 16, 2) constraint because the minimum number of consecutive "0"s is d=2, the maximum is k=16 and the spacing is s=2 (that is, even spacing, where all run lengths are multiples of 2). Note that NRZI notation does not uniquely specify the signal waveform because an inverted waveform exists for the same NRZI code string.

Two levels are defined for NRZ or Level Coding. One level is assigned a binary "1" and the other level is assigned a binary "0". The integers in the run length coded sequence represent the run lengths of consecutive 0's and 1's in the NRZ coded waveform. Unlike NRZI, there is a unique correspondence between a waveform and its NRZ notation. Because rising signal transitions are distinguished from falling signal transitions herein, and the uniqueness property of the NRZ representation permits the two transition types to be easily discriminated, much of the discussion of the encoder and decoder design of this invention employs NRZ signal representations.

The (2, k, 2) Waveform Transformation Invention

The fundamental accomplishment of the method of this invention is to store and retrieve even-spaced rate M/N (2, k, 2) RLL code data in the manner that permits most or all of the associated channel circuitry to operate at half of the usual binary clock rate. FIG. 1 shows a waveform even-spaced RLL waveform (a) 16 superimposed on a series of vertical dotted lines each representing the beginning of a binary clock interval $T_1=1/F_1$, where the binary clock rate $F_1$, is herein denominated the full-speed binary clock rate.

FIG. 1 provides the NRZ code symbol stream and the corresponding NRZI code symbol stream corresponding to waveform 16. The Run Length integer representation of the NRZ code symbol stream for waveform 16 can be written (3, 3, 5, 17, 17, 3, 3). The Run Length integer representation of the equivalent NRZI code symbol stream can be written ( 2, 2, 4, 16, 16, 2, 2). Note that the NRZI Run Length representation includes only the count of the "0" code symbol runs between "1" code symbols represented by signal waveform 16 transitions. In contrast, the NRZ Run Length representation of waveform 16 includes the counts of alternate "0" and "1" code symbol runs represented by the code signal polarity.

In the NRZ Run Length representation, all integers are odd, which is a characteristic of the even-spaced RLL code constraint. To express the code waveform (b) in terms of a halfspeed clock $F_2=F_1/2$, the NRZ representation must be transformed such that all Run Length integers are even. This can be accomplished in many different ways, for instance by alternately adding −1 and +1 to every integer of the NRZ sequence. If this is done to the waveform 16 sequence in FIG. 1, the modified sequence becomes (2, 4, 4, 18, 16, 4, 2). This modified sequence can be written as (1, 2, 2, 9, 8, 2, 1) units of the $F_2$ half-speed clock and is illustrated as waveform (C) 18 in FIG. 1. If this simple alternate increment/decrement procedure is used, the length of waveform 18 remains within+1 or−1 symbol of waveform 16.

The method of this invention arises from the unexpectedly advantageous observation that the above transformation changes the even-spaced RLL code waveform to an asymmetric RLL code waveform in NRZI notation. That is, in terms of the half-speed clock $F_2$, the distance between signal waveform 18 transitions in FIG. 1 satisfies a RLL constraint such that the distance from rising transition to falling transition is constrained to be between 1 and k/2 half-speed clock intervals $T_2=1/F_2$ and the distance from falling transition to rising transition is constrained to be between 2 and 1+k/2 half-speed clock intervals $T_2$. In NRZI RLL notation, this is a (0, K−1; 1, K) asymmetrical constraint where K=k/2. For the (2, 16, 2) code illustrated in FIG. 1, the corresponding asymmetrical RLL code in FIG. 1 satisfies a ( 0, 7; 1, 8) asymmetrical constraint. The asymmetrical notation $(d_1,k_1; d_2, k_2)$ herein denominates a constraint that alternates between $(d_1,k_1)$ and $(d_2, k_2)$ at each signal waveform transition.

From the above, it can be appreciated that a half-speed clock RLL code signal waveform (e.g., waveform 18 in FIG. 1 ) can be created with many different transformation methods. For example, an alternative transformation of code signal waveform 16 can be accomplished by subtracting 1 from every integer of the NRZ Run Length representation, or by adding 1 to every such integer. Either procedure provides the even-valued Run Length integers required for compatibility with a half-speed binary clock rate. However, the length of the resulting waveform analogous to waveform 18 must differ from the original waveform 16 by a variable amount, which is very disadvantageous for analog signal processing (but may lend itself to an all-digital buffered signal processing implementation). Accordingly, the alternate addition of−1 and+1 to every integer in the NRZ Run Length sequence is the preferred signal transformation method of this invention.

There are also several useful methods for implementing the preferred method for transforming the even-spaced RLL waveform 16 of FIG. 1 to the asymmetric RLL waveform 18. If a synchronized half-speed binary clock signal is available, such as the $F_2$ clock shown in FIG. 1, the original even-spaced RLL waveform 16 can merely be resampled with the half-speed clock $F_2$ using a simple exclusive-OR circuit to provide the asymmetric RLL waveform 18. Although two half-speed clock synchronization phases are possible, the illustration in FIG. 1 arbitrarily chooses the half-speed clock $F_2$ synchronized with the "falling" signal transition of waveform 16. If no synchronized half-speed clock is available, the transformation can be made merely by delaying all rising signal transitions (or all falling signal transitions) of waveform 16 by a single full-speed clock interval $T_1=1/F_1$.

In the following description, an even-spaced RLL rate ⅖ (2, 16, 2) RLL code signal (waveform 16) and a corresponding asymmetric rate ⅘ (0, 7; 1, 8) RLL transform signal (waveform 18) are used to describe the system and procedures of this invention. It should be appreciated that the principles described herein are applicable to all even-spaced rate M/N (2d, 2k, 2) RLL code signals and their related asymmetric rate 2M/N (d−1, k−1; d, k) RLL transform signals, provided that d and k are non-zero positive integers.

FIGS. 2 and 3 show functional block diagrams of illustrative embodiments of the elements required to encode, write, detect and decode even-spaced RLL waveforms using a half-speed binary clock rate $F_2$. Original user data bits are provided at an input 20 to an encoder 22 in FIG. 2. Encoder 22 produces the corresponding asymmetric RLL code symbols, which are represented as an asymmetric code signal 24. Because rate M/N=⅘ in the example discussed above in connection with FIG. 1, five code symbols are generated in encoder 22 for every four original data bits at input 20. The five code symbols are transferred as asymmetric code signal 24 at the half-speed clock rate F2 to a polarity-sensitive signal transition delay circuit 26. In FIG. 2, delay circuit 26 delays every falling signal transition in signal 24 by one full-speed clock period $T_1$, thereby effecting the transformation from asymmetric RLL code symbols to even-spaced RLL code symbols. The even-spaced RLL code symbols are then transferred as an even-spaced code signal 28 at full-speed clock rate $F_1$, to the write circuit 30. Write circuit 30 may, for instance, include the write driver for a magnetic or optical disk system. Circuit 30 produces the signals necessary to transfer the even-spaced RLL code symbols in signal 28 to a storage medium 32 at the full-speed binary clock rate $F_1$.

In FIG. 3, the analog even-spaced RLL code signal representing the stored RLL code symbols is detected in storage medium 32 by a read amplifier 34 at the full-speed binary clock rate $F_1$. The amplified even-spaced code signal 36 is examined for rising and falling signal transitions in a positive transition detector 38 and a negative transition detector 40. The rising signal transitions 42 are delayed by one full-speed binary clock interval $T_1$ in a delay circuit 44. Detectors 38 and 40 may include, for instance, peak detectors suitable for magnetic recording channels or threshold detectors suitable for pulse-width modulation (PWM) optical recording channels. The only special requirement for detectors 38 and 40 is the capacity for discrimination between positive and negative code signal transitions.

The delayed rising signal transitions 46 and the falling signal transitions 48 are combined in a summing circuit 50 to produce the asymmetric RLL code transform signal 52. Asymmetric RLL code signal 52 is presented to a data synchronizer 54 for synchronization with the half-speed binary clock $F_2$. The resulting synchronized asymmetric RLL code signal 56 is then decoded in an asymmetric decoder 58 according to the relevant asymmetric decoder alphabet, thereby recovering the original user data bits at user data output 60 at the half-speed binary clock rate $F_2$.

The Asymmetric RLL Encoder

Asymmetric codes were first disclosed in the above-cited Davie et al. patent. Davie et al. devised their RLL codes from scratch starting from the finite state transition diagram and proposed a rate ⅘ (0, 10; 1, 11) RLL code. Their asymmetric RLL code is useful as a half-speed binary clock transform of a (2, 22, 2) even-spaced RLL code, but neither of these is a very attractive RLL code. Although a reasonable (0, 7; 1, 8) RLL code can be devised directly from the finite state transition diagram using state splitting methods, the preferred approach is to alter an existing (2, 16, 2) code to obtain the equivalent asymmetric RLL code transform.

Figure 5:
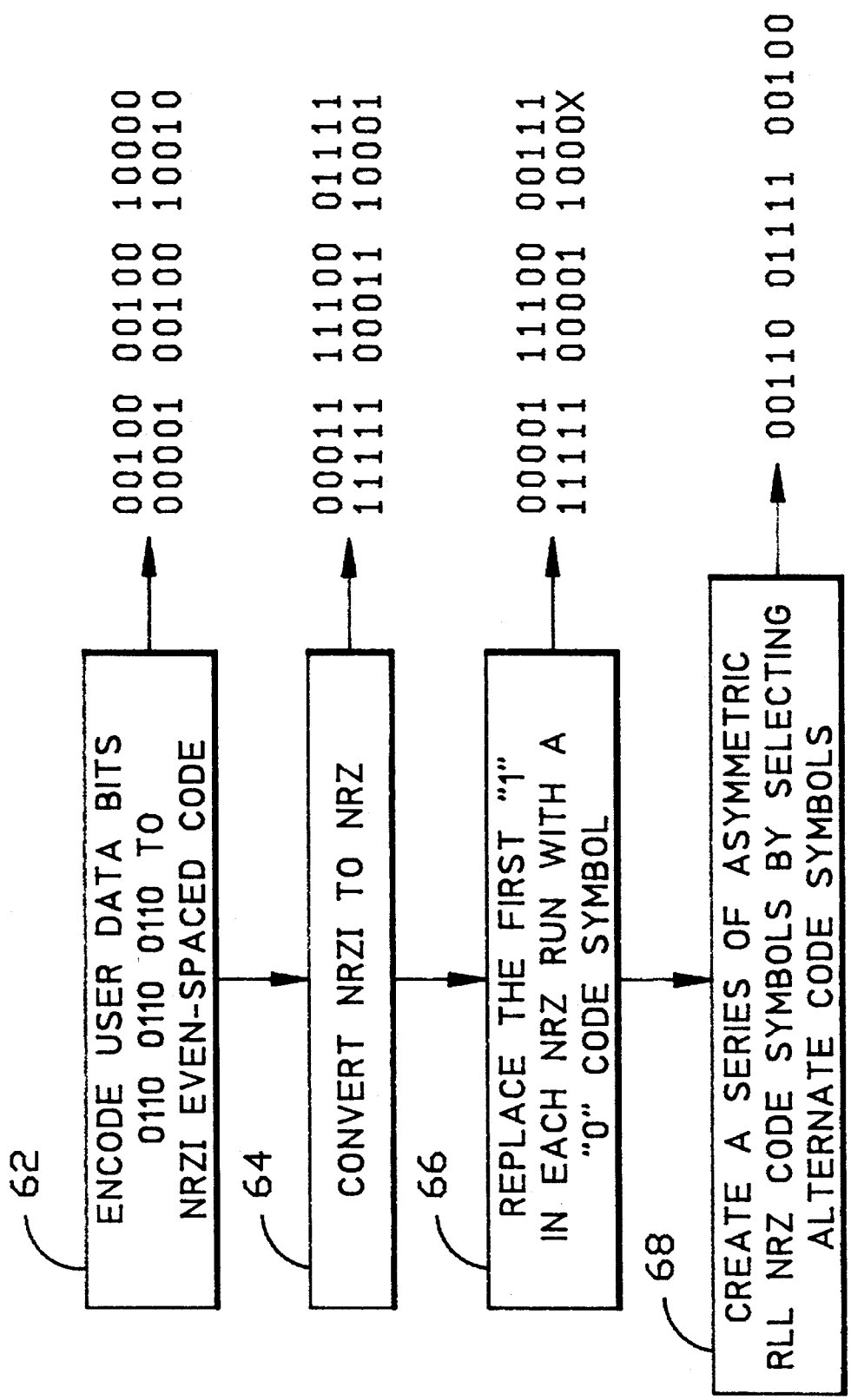
FIG. 5 illustrates the encoding and conversion of user data to (2, 16, 2) even-spaced RLL code and therefrom to (0, 7; 1, 8) asymmetric RLL code in accordance with the method of this invention.

FIG. 5 shows an illustrative procedure for encoding user data bits to create an asymmetric NRZ rate ⅘ RLL code stream using only the NRZI even-spaced rate ⅖ RLL encoding dictionary provided in FIG. 4. In a first encoding step 62, the user data bit stream is encoded using the encoding dictionary of FIG. 4 to create an NRZI even-spaced RLL code stream. In FIG. 5, the twelve exemplary user data bits 0110 0110 0110 are encoded according to the encoding dictionary in FIG. 4 to yield the thirty code symbols 00100 00100 10000 00001 00100 10010. In a conversion step 64, the NRZI even-spaced RLL code stream is converted to a NRZ format that can be written as 00011 11100 01111 11111 00011 10001, or as (3, 5, 3, 9, 3, 3, 3) in terms of the run length of like code symbols.

In a transforming step 66, the NRZ even-spaced RLL code stream is transformed according to the method of this invention by replacing the first "1" in each NRZ run with a "0" code symbol (alternately adding ±1 to the Run Length integers). This yields 00001 11100 00111 11111 00001 1000X, or (4, 4, 4, 8, 4, 2, 4). Finally, by sampling the resulting transformed code signal at half of the full-speed binary clock rate in a sampling step 68, the desired asymmetric NRZ RLL code signal is found to be 00110 01111 00100, or (2, 2, 2, 4, 2, 1, 2). If desired, an additional conversion step (not shown) can be employed to convert the asymmetric NRZ RLL code symbols to a NRZI form, yielding 01010 10001 0110X. Note that this NRZI RLL code signal conforms to the asymmetrical RLL constraint ( 0, 7; 1, 8) and that only five code symbols are required to represent four original user data bits.

The even-spaced (2, 16, 2) encoding alphabet illustrated in state-machine form in FIG. 4 can be understood as follows. For the four user data bits 01 10, assuming that the beginning state is state 1, two five-bit code words are found as follows. At state 1, the code symbol 00100 is seen in FIG. 4 as corresponding to user data bits 01. The "next state" specified for user data 01 in state 1 is "next state"2. In state 2, the next two user bits 10 are found to correspond to the five code symbols 00100 and a "next state"19. Thus, beginning in state 1, the user bits 0110 are encoded to the ten code symbols 00100 00100. This result differs when beginning in a state other than state 1.

The even-spaced NRZI RLL code symbols can also be immediately convened to asymmetric NRZI RLL code transform symbols merely by combining each pair of even-spaced code symbols in a logical OR operation to yield a single asymmetric code symbol. For example, consider the user data bits 0111 and assume an initial state of 5. The first five code symbols from FIG. 4 are 00001 and the next state is 2. The second five code symbols for the 11 user data bits in state 2 are 00100. When the five pairs of adjacent evenspaced NRZI code symbols are ORed together, the five asymmetric NRZI code symbols 00110 are produced. The asymmetric NRZ code symbols may then be produced in accordance with the conversion step 64 in FIG. 5, yielding 00010. Thus, an asymmetric encoding dictionary may include correspondence of user data (0111) to code symbols (00010) at state 5.

Note that the conversion from NRZI format to NRZ format requires an arbitrary choice of phase. In the writing scheme illustrated in FIG. 2, the falling signal transition is delayed after encoding to recreate the desired even-spaced RLL waveform. With this choice of transition delay, writing is performed correctly only if the phase is chosen to allow 010 NRZ data patterns and disallow 101 NRZ data patterns.

Another method of asymmetrically encoding user data bits is to design a new finite state machine that directly encodes user data according to an asymmetric encoder alphabet constrained by the asymmetric RLL constraint (0, k−1; 1, k). In general, a rate 2M/N (0, k−1;1, k) encoder can be constructed from the finite state machine for a rate M/N (2, 2k, 2) encoder. This technique would permit the direct NRZ encoding of the user data bit stream. The "correct" choice of NRZ phase can be built directly into the encoder.

For the general case of even-spaced (2, 2k, 2) encoding, the even-spaced RLL encoder is a finite state machine that has a number of states. In each state, M user bits are encoded into N code symbols and a next state is designated. The M code bits are grouped into code words. Each state is associated with $2^M$ edges and each edge is chosen according to the user input data bits. The edge chosen then specifies a corresponding code word and points to the next state. To obtain an asymmetric encoder, a new (2, 2k, 2) encoder is first derived by redefining each state so that each step contains two encoding steps. That is, 2M input bits are encoded at each state and the number of outgoing edges is $2^{2M}$. Each edge then specifies a 2N symbol code word and points to the next state. This technique forces the number of symbols in each even-spaced code word to be even. The asymmetric (0, k–1; 1, k) encoder is then obtained merely by changing the even-spaced code words to NRZ representation and modifying them by deleting every other bit (e.g., FIG. 5).

As a useful example, consider the even-spaced rate ⅖ (2, 16, 2) code developed by Weigandt et al. (FIG. 4). The finite state machine given in FIG. 4 consists of 23 states. The code words are five symbols long and are provided in NRZI representation. If each state is expanded to include two encoding steps, the table in FIG. 6 is obtained. The number of input data bit combinations (edges) per state is expanded to provide encoding in a single step of four input bits to form ten even-spaced NRZ code symbols. The NRZ phase is arbitrarily chosen such that rising RLL code signal waveform transitions occur on even-numbered fullspeed clock intervals ($T_1$). The five-bit asymmetric RLL code words are derived by selecting every other code symbol from the even-spaced NRZ representation (odd code symbols). The resulting NRZ asymmetric RLL encoding dictionary in shown in FIG. 6. Because half of the even-spaced code symbols are discarded, the encoding rate is twice that of the original evenspaced encoder and the associated binary clock rate $F_2$ is half of the full-speed binary clock rate $F_1$.

Code Symbol Writing Methods

In a magnetic recording data storage apparatus, the asymmetric RLL signals from the encoder are most useful for storage if the waveforms are first converted to even-spaced RLL form. This can be accomplished by extending the duration between rising and falling code signal transitions by one-half of the half-speed clock interval $T_2/2$. FIGS. 7A–7B show two methods that accomplish this by delaying the falling signal transition. In FIG. 7A, a retriggerable one-shot multivibrator 70 is employed to introduce a fixed delay to only the falling signal transitions. In FIG. 7B, the delay is accomplished using two D-type multivibrators 74 driven by opposite phases of the half-speed binary clock $F_2$, which is presumed to be a fifty percent duty-cycle clock waveform. In FIG. 7A, the recovered evenspaced RLL code signal 80 from multivibrator 70 is transferred to a write driver 82 and therefrom to a recording head 84. In FIG. 7B, the OR-gate 78 output represents the even-spaced RLL code signal on line 80.

In optical recording, the NRZ data from the asymmetric RLL encoder can be used directly to control laser pulses in an optical disk system because the half-clock delay required to transform the asymmetric RLL code symbols to the even-spaced RLL code symbols can be achieved by advantageous use of the natural pulse broadening that occurs when writing onto optical media. For instance, FIG. 8 shows how the half-speed (asymmetric) NRZ encoder symbols waveform (b) can be employed to generate a laser pulses wave form (a) that writes circular domains, exemplified by domain 86, on an optical disk. The laser power and pulse width in waveform (a) can be adjusted so that mark written with a single pulse has a width corresponding to three full-speed binary clock waveform (c) intervals, $3T_1 = 1.5T_2$. Adjacent "1"s in the NRZ code symbol stream form long marks in the optical media because of the overlapping of individual circular domains. The written pattern shown in FIG. 8 is formed using the asymmetric (0, 7; 1, 8) NRZ code stream symbols waveform (b) and has rising and falling transitions representing even-spaced (2, 16, 2) NRZI code symbols. Thus, the asymmetric to even-spaced RLL code transformation is effected by laser pulse broadening alone.

FIG. 9 shows a functional block diagram of exemplary circuitry suitable for driving a laser in the manner discussed above in connection with FIG. 8. The asymmetric NRZ RLL code symbols are combined with the half-speed binary clock $F_2$ in a one-shot multivibrator 88 to produce laser driving pulses on line 90, which connects to a laser driver 92 and therefrom to a laser diode 94 to provide the optical pulses necessary for magneto-optical data recording.

Recorded Data Recovery Methods

The code symbol waveforms stored in the magnetic or optical media are characteristic of even-spaced RLL code symbols. The data recovery or read channel circuitry of this invention operates to create the half-speed asymmetric RLL code signal that is synchronized to a half-speed binary clock $F_2$. One useful method for data detection and synchronization according to this invention is discussed above in connection with FIG. 3. Positive and negative code signal transitions are separately detected. Positive transitions are delayed and then combined with the negative transitions to create a resulting digital signal at line 52 that is then sent to data synchronizer 54, which derives a clock (not shown) and generates a code signal standardized to that clock in any useful manner known in the art. An important advantage of the method of this invention is that a standard data synchronizer can be used to perform the function of data synchronizer 54. This permits the read channel apparatus of this invention to be used with existing data recordings and data synchronizers.

FIG. 10 shows an alternative apparatus suitable for recovering pulse width modulated (PWM) optical code data recordings. A comparator 96 is employed to detect the edges of written marks by comparing the analog (2,16,2) PWM optical sensor waveform 97 with a threshold voltage 98. The output of comparator 96 is routed to the two phase detectors 100 and 102. Phase detector 100 is synchronized to the positive edge of a half-speed clock $F_2$ generated on line 99 by a voltage-controlled oscillator (VCO) 104 and is triggered by rising code signal waveform transitions. Phase detector 102 is synchronized to the negative VCO 104 clock pulse and is triggered by falling code signal waveform transitions. VCO 104 is synchronized by means of a phase error correction circuit including an OR-gate 106 and a charge pump and filter 108, which feeds back the phase error outputs 101 and 103 from respectively phase detectors 100 and 102, respectively. The detection outputs 105 and 107 from phase detectors 100 and 102) respectively are short pulses synchronized to the VCO clock that are generated whenever a transition is detected. These short pulse outputs 105 and 107 are routed to a RS multivibrator 110 that produces the even-spaced NRZ RLL code signal on line 112. VCO 104 runs at the half-speed clock frequency $F_2$ and is presumed to have a fifty percent duty cycle output. By sampling RS multivibrator output 112 at the half-speed binary clock frequency $F_2$ using a D-type multivibrator 114, the asynchronous NRZ RLL code signal is generated. That is, multivibrator 114 passes only every other one of the NRZ code symbols presented at line 112.

Asymmetric RLL Decoding Methods

Decoder 58 (FIG. 3) must recover the original user data bits from an asymmetric rate 2M/N (d−1, k−1; d, k) RLL code signal. If the asymmetric encoder is designed using statesplitting methods, then a sliding block asymmetric decoder can be found.

The asymmetric decoder of FIG. 11 was found by analyzing the encoder of FIG. 6. Because the encoder in FIG. 6 was derived from the even-spaced (2, 16, 2) code of FIG. 4, the decoding properties must have the same features as the even-spaced (2, 16, 2) decoding alphabet, which was found to require a decoding window of twenty code symbols (four code words) in width to decode two user bits. The decoding window is then slid one code word (five code symbols) and the next two user bits are decoded. Thus, if the even-spaced RLL code is to be decoded four user bits at a time, a decoding window of five code words (25 code symbols) is required.

Because the (0, 7; 1, 8) RLL code is essentially merely the (2, 16, 2) RLL code in NRZ form with every other bit missing, the (0, 7; 1, 8) RLL code decoding window should require only about half of the number of code symbols. The inventors used a computer program to generate all valid twelve-symbol code strings possible from the encoder alphabet of FIG. 6 and explicitly verified that an asymmetric decoding window of twelve code symbols in width is sufficient for unique decoding of four user bits. These valid twelve bit sequences are summarized in FIG. 11 in logically-minimized form. The NRZ decoding alphabet in FIG. 11 can be embodied as a read-only memory (ROM) to implement an asymmetrical sliding block decoder.

The asymmetric (0, 7; 1, 8) RLL decoder is shown in FIG. 11 in the form of a 3-dimensional table of masking bits $\{m_{ijk}\}$ that are used to decode 12 code symbols $\{x\}$ to obtain 4 user bits $\{y\}$ according to the formal relationship $$y_k = \sum_{j=0}^{24} \left[ \prod_{i=0}^{11} (m_{ijk} * x_i) \right]$$

where the masking operator * is defined herein such that $$0 * x_i = \overline{x_i}, \quad 1 * x_i = x_i \text{ and "don't care"} * x_i = \text{"don't care"}.$$

The Boolean "and" operator Π and the Boolean "or" operator ρ are defined as commonly known in the art. The rows in FIG. 11 are indexed from i=11 to i=0 and each table column is indexed from j=0 to a maximum value of 24. The rows not shown in some tables are "don't care" rows. These depend on which of the four tables (k=0,1,2,3) is used. The "don't care" rows exist above j=15 for k=3, j=23 for k=2 and j=17 for k=1. The sliding block decoder of FIG. 11 operates on twelve code symbols ($x_{11}-x_0$) to create each of four user bits ($y_3-y_0$) by "anding" the masked code bits for a row to create a single bit for that row, which is "ored" with all other such row bits in the $k^{th}$ table to obtain the $k^{th}$ user bit $y_k$.

The asymmetrical NRZI code signal can also be decoded using a NRZI decoding alphabet. The NRZI decoder may also be derived from the (2, 16, 2) sliding window decoder found by Weigandt et al. As discussed above in connection with FIG. 11, five asymmetric RLL code symbols are expanded to ten even-spaced RLL code symbols, presented to the even-spaced RLL decoder and decoded to produce four user bits, two bits at a time. However, unlike the encoder input (user data 20 in FIG. 2), decoder input symbols are error-prone and may result in error propagation if coded in NRZI form. For this reason, the clocked detector output waveform (line 56 in FIG. 3) is coded in NRZ form and the conversion to NRZI and expansion to even-spaced (2, 16, 2) form is accomplished in a single step. For example, consider the following Table 2:

TABLE 2

| | | | | | | | | | | |
|---|---|---|---|---|---|---|---|---|---|---|
| (0, 7; 1, 8) NRZ | (0) | 0 | | 0 | | 1 | | 0 | | 0 |
| (0, 7; 1, 8) NRZI | | 0 | | 0 | | 1 | | 1 | | 0 |
| (2, 16, 2) NRZI | 0 | 0 | 0 | 0 | 1 | 0 | 0 | 1 | 0 | 0 |
| USER DATA BITS | | | | 1 | 0 | | | | 1 | 1 |

Table 2 shows an example of the transformation from asymmetric NRZ code symbol input to user data bit output. The NRZ to NRZI conversion can be eliminated by using the following transformation method. To directly convert (0, 7; 1, 8) NRZ to (2, 16, 2) NRZI (line 1 to line 3 in Table 2), perform the following steps:

(a) replace every "0" preceded by "0" or every "1" preceded by "1" with "00";

(b) replace every "1" preceded by "0" with "10"; and (c) replace every "0" preceded by "1" with "01"

With the above three-step procedure, the even-spaced rate ⅖ (2, 16, 2) NRZI decoder can be used directly to decode the asymmetric rate ⅘ (0, 7; 1, 8) NRZ code symbols.

It should be appreciated that the above methods for encoding, detecting and decoding even-spaced (2, 2k, 2) RLL codes can effectively double the rate of the code. For the (2, 16, 2) code, excellent high-density data storage performance can be achieved because of the large detection window. This performance can be achieved with an effective code rate of 0.8, a rate that makes high data rate operation practical. The essence of the method of this invention is to convert the even-spaced RLL code symbols to asymmetric RLL code symbols with twice the code rate. In particular, it can be appreciated from the above discussion that a even-spaced rate ⅖ (2, 16, 2) channel can be advantageously operated using an asymmetric rate ⅘ (0, 7; 1, 8) RLL code.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for operating a serial binary data channel wherein a first code signal represents a sequence of original data bits according to a first encoding alphabet constrained by an even-spaced RLL constraint M/N (2d, 2k, 2), wherein said first code signal includes a sequence of code symbols occurring at a first binary data clock rate $F_1$, said first code signal having a sequence of rising and falling signal transitions each representing a first said code symbol separated from one another by no fewer than a plurality 2d and no more than a plurality 2k of second said code symbols, wherein a plurality N of said code symbols represents a plurality M of said original data bits and d, k, M and N are positive integers, said method comprising the steps of:

(a) adding to said first code signal an odd integer quantity J of said second code symbols between each sequential pair of said first code symbols, thereby creating a second code signal representing a sequence of said code symbols occurring at a second binary data clock rate $F_2=F_1/2$, said second code signal having a sequence of rising and falling signal transitions each representing said first code symbol separated from one another by no fewer than a plurality $D_1$ and no more than a plurality $K_1$ of said second code symbols, wherein said run length pluralities ($D_1$, $K_1$) are non-negative integers having values that alternate between (D, K) and (D–1, K–1) and wherein a plurality N of said code symbols represent a plurality 2M of said original data bits according to a second encoding alphabet constrained by an asymmetrical RLL constraint 2M/N (D–1, K–1; D, K); and (b) decoding said second code signal to recover said original data bit sequence.

2. The method of claim 1 wherein said odd integer quantity $J=\pm 1$.

3. The method of claim 2 wherein said odd integer quantity J alternates between +1 and –1 at each said signal transition, whereby said second code signal run length pluralities ($D_1$, $K_1$) have values that alternate between (d–1, k–1) and (d, k), thereby constraining said second encoding alphabet by an asymmetrical constraint 2M/N (d–1, k–1; d, k).

4. The method of claim 3 wherein said plurality 2d=2.

5. The method of claim 4 wherein said plurality 2k=16.

6. The method of claim 5 wherein said coding rate M/N=⅔.

7. The method of claim 6 wherein said first encoding alphabet is specified according to the table of FIG. 4 herein.

8. The method of claim 7 wherein said second encoding alphabet is specified according to the table of FIG. 6 herein.

9. The method of claim 3 wherein said adding step (a) consists essentially of the step of:

(a.1) delaying by one first clock interval $T_1=1/F_1$ each said rising signal transition in said first code signal.

10. The method of claim 9 wherein said plurality 2d=2.

11. The method of claim 10 wherein said plurality 2k=16 and said code rate M/N=⅔.

12. The method of claim 3 wherein said adding step (a) consists essentially of the step of:

(a.1) delaying by one first clock interval $T_1=1/F_1$ each said falling signal transition in said first code signal.

13. The method of claim 12 wherein said plurality 2d=2.

14. The method of claim 13 wherein said plurality 2k=16 and said code rate M/N ⅔.

15. The method of claim 1 wherein said plurality 2d=2.

16. The method of claim 15 wherein said plurality 2k=16.

17. The method of claim 16 wherein said coding rate M/N=⅔.

18. A method for operating a data storage device having a write channel for storing a sequence of original data bits in RLL coded form in at least one data storage medium, said method comprising the steps of:

(a) creating in said write channel an asymmetric code signal having rising and falling signal transitions representing an asymmetric sequence of code symbols occurring at a first binary clock rate $F_1$, wherein a plurality N of said asymmetric code symbols represent a plurality 2M of said original data bits according to a first encoding alphabet constrained by an asymmetric RLL constraint 2M/N (d–1, k–1; d, k), wherein M, N, d and k are positive integers;

(b) delaying each said rising signal transition in said asymmetric code signal by one second data clock interval $T_2=\frac{1}{2}F_1$ to create an even-spaced code signal having rising and falling transitions representing an even-spaced sequence of code symbols occurring at a second binary clock rate $F_2=2F_1$, wherein a plurality N of said even-spaced code symbols represent a plurality M of said original data bits according to a second encoding alphabet constrained by even-spaced RLL constraint M/N (2d, 2k, 2); and (c) transferring said even-spaced sequence of code symbols to said at least one storage medium, whereby said original bit data is stored in RLL coded form according to said second encoding alphabet.

19. The method of claim 18 wherein said data storage device includes a read channel for retrieving said original bit data, said method further comprising the steps of:

(d) reading said stored even-spaced code signal from said storage medium at said second binary clock rate $F_2$, wherein said even-spaced code signal represents said original bit data according to a first decoding alphabet constrained by even-spaced RLL constraint M/N (2d, 2k, 2);

(e) delaying each said falling transition in said even-spaced code signal by one said second binary clock interval $T_2=1/F_2$ to create said asymmetric code signal representing said original bit data according to a second decoding alphabet constrained by even-spaced RLL constraint M/N (2d, 2k, 2); and (f) decoding said first code signal to retrieve said original bit data according to said second decoding alphabet.

20. The method of claim 19 wherein:

said first encoding alphabet is specified according to the table of FIG. 6 herein;

said second encoding alphabet is specified according to the table of FIG. 4 herein.

21. The method of claim 20 wherein:

said second decoding alphabet is specified according to the table of FIG. 11 herein.

22. The method of claim 19 wherein said first delaying step (b) is instead applied only to each said falling transition in said asymmetric code signal and said second delaying step (e) is instead applied only to each said rising signal transition in said even-spaced code signal.

23. The method of claim 18 wherein said delaying step (b) is instead applied only to each said falling transition in said asymmetric code signal.

24. A method for operating a data storage device having a read channel for retrieving original bit data stored in RLL coded form in at least one data storage medium, said method comprising the steps of:

(a) creating in said read channel; responsive to said stored data, an even-spaced code signal having rising and falling signal transitions representing an even-spaced sequence of code symbols occurring at a first binary clock rate $F_1$, said even-spaced code signal representing said original bit data according to a first decoding alphabet constrained by even-spaced RLL constraint M/N (2d, 2k, 2);

(b) delaying each said falling signal transition in said even-spaced code signal by one said first binary clock interval $T_1=1/F_1$ to create an asymmetric code signal representing an asymmetric sequence of code symbols occurring at a second binary clock rate $F_2=F_1/2$, said asymmetric code signal representing said original bit data according to a second decoding alphabet; and (c) decoding said asymmetric code signal to retrieve said original bit data according to said second decoding alphabet.

25. The method of claim 24 wherein said delaying step (b) is instead applied only to each said rising transition in said even-spaced code signal.

26. An apparatus for creating from a serialized string of original bit data an even-spaced run-length-limited (RLL)-encoded data signal including rising and falling signal transitions representing an even-spaced sequence of code symbols occurring at a first binary clock rate $F_1$, wherein a plurality N of said code symbols represents a plurality M of said original data bits according to a first encoder alphabet constrained by an even-spaced RLL constraint M/N (2d, 2k, 2) such that an even plurality of at least 2d and no more than 2k of a first said code symbol occur between any sequential pair of a second said code symbol, wherein d, k, M and N are positive integers, said apparatus comprising:

encoding means for creating from said serialized string of original bit data an asymmetric RLL-encoded data signal including rising and falling signal transitions representing an asymmetric sequence of said code symbols occurring at a second binary clock rate $F_2=F_1/2$, wherein said plurality N of said code symbols represents a plurality 2M of said original data bits according to a second encoder alphabet constrained by an asymmetric RLL constraint 2M/N(d−1, k−1; d, k); and transforming means for converting said asymmetric RLL-encoded data signal to said even-spaced RLL-encoded data signal.

27. The apparatus of claim 26 wherein d=1.

28. The apparatus of claim 27 wherein k=8 and M/N=⅔.

29. The apparatus of claim 26 wherein said transforming means comprises:

delay means for delaying by one first clock period $T_1=1/F_1$ each said rising signal transition in said asymmetric RLL-encoded data signal, whereby said even-spaced RLL-encoded data signal is produced.

30. The apparatus of claim 26 wherein said transforming means comprises:

delay means for delaying by one first clock period $T_1=1/F_1$ each said falling signal transition in said asymmetric RLL-encoded data signal, whereby said even-spaced RLL-encoded data signal is produced.

31. A apparatus for creating from a serialized string of original bit data an even-spaced run-length-limited (RLL)-encoded data signal including rising and falling signal transitions representing an even-spaced sequence of code symbols occurring at a first binary clock rate $F_1$, wherein a plurality N of said code symbols represents a plurality M of said original data bits according to a first encoder alphabet constrained by an even-spaced RLL constraint M/N (2d, 2k, 2) such that an even plurality of at least 2d and no more than 2k of a first said code symbol occur between any sequential pair of a second said code symbol, wherein d, k, M and N are positive integers, said apparatus comprising:

transforming means for converting said even-spaced RLL-encoded data signal to an asymmetric RLL-encoded data signal including rising and falling signal transitions representing an asymmetric sequence of said code symbols occurring at a second binary clock rate $F_2=F_1/2$, wherein said plurality N of said code symbols represents a plurality 2M of said original data bits according to a second encoding alphabet constrained by an asymmetric RLL constraint 2M/N(d−1, k−1; d, k); and decoding means for producing said serialized string of original bit data from said asymmetric RLL-encoded data signal according to a first decoding alphabet constrained by said asymmetric RLL constraint 2M/N(d−1, k−1; d, k).

32. The apparatus of claim 31 wherein d=1.

33. The apparatus of claim 32 wherein k=8 and M/N=⅔.

34. The apparatus of claim 31 wherein said transforming means comprises:

delay means for delaying by one first clock period $T_1=1/F_1$ each said rising signal transition in said even-spaced RLL-encoded data signal, whereby said asymmetric RLL-encoded data signal is produced.

35. The apparatus of claim 31 wherein said transforming means comprises:

delay means for delaying by one first clock period $T_1=1/F_1$ each said falling signal transition in said even-spaced RLL-encoded data signal, whereby said asymmetric RLL-encoded data signal is produced.

36. A data storage system in which an even-spaced RLL code string representing original bit data is retrieved from a data storage medium, said even-spaced RLL code string having code symbols occurring at a first binary clock rate $F_1$, a plurality N of said code symbols representing a plurality M of said original data bits according to an even-spaced encoding alphabet constrained by an even-spaced RLL constraint M/N(2d, 2k, 2), wherein d, k, M and N are positive integers, said data storage system comprising:

reader means coupled to said data storage medium for reading said even-spaced code string from said data storage medium;

RLL translator means coupled to said reader means for translating said even-spaced RLL code string to an asymmetric RLL code string of said code symbols occurring at a second binary clock rate $F_2=F_1/2$, wherein said plurality N of said code symbols represent a plurality 2M of said original data bits according to an asymmetric encoding alphabet;

asymmetric RLL decoder means coupled to said RLL translator means for recovering said original data bits from said asymmetric RLL code string according to an asymmetric RLL decoding alphabet; and output means coupled to said asymmetric RLL decoder means for producing said original bit data.

37. The system of claim 36 wherein d=1.

38. The system of claim 37 wherein k=8 and M/N=⅔.

39. The system of claim 38 wherein said asymmetric RLL decoding alphabet is specified according to the table of FIG. 11 herein.

40. The system of claim 36 wherein said data storage system further comprises:

a rewritable magneto-optical data storage medium.

41. A data storage system in which an even-spaced RLL code string representing original bit data is written onto a data storage medium, said even-spaced RLL code string having code symbols occurring at a first binary clock rate $F_1$, wherein a plurality N of said code symbols represent a plurality M of said original data bits according to an even-spaced RLL encoding alphabet constrained by an even-spaced RLL constraint M/N(2d, 2k, 2), wherein d, k, M and N are positive integers, said data storage system comprising:

input means for receiving an original bit sequence signal representing said original bit data;

asymmetric RLL encoder means coupled to said input means for creating an asymmetric RLL code string of said code symbols occurring at a second binary clock rate $F_2=F_1/2$, wherein said plurality N of said code symbols represents a plurality 2M of said original data bits according to an asymmetric RLL encoding alphabet;

even-spaced RLL translator means coupled to said asymmetric RLL encoder means for translating said asymmetric RLL code string to said even-spaced RLL code string; and write means coupled to said RLL translator means for writing said even-spaced RLL code string to said data storage medium.

42. The data storage system of claim 41 in which said even-spaced RLL code string is both written on and read from said data storage medium, said system further comprising:

reader means for reading said even-spaced RLL code string from said data storage medium;

RLL translator means coupled to said reader means for translating said even-spaced RLL code string to an asymmetric RLL code string of said code symbols occurring at a second binary clock rate $F_2=F_1/2$, wherein said plurality N of said code symbols represent a plurality 2M of said original data bits according to an asymmetric encoding alphabet;

asymmetric RLL decoder means coupled to said RLL translator means for recovering said original data bits from said asymmetric RLL code string according to an asymmetric RLL decoding alphabet; and output means coupled to said asymmetric RLL decoder means for producing said original bit data.

43. The system of claim 42 wherein d=1.

44. The system of claim 43 wherein k=8 and M/N=⅔.

45. The system of claim 44 wherein said asymmetric RLL encoding alphabet is specified according to the table of FIG. 6 herein.

46. The system of claim 42 wherein said data storage system further comprises: a rewritable magneto-optical data storage medium.

47. The system of claim 41 wherein d=1.

48. The system of claim 47 wherein k=8 and M/N=⅔.

49. The system of claim 48 wherein said asymmetric RLL encoding alphabet is specified according to the table specified in FIG. 6 herein.

50. The system of claim 37 wherein said data storage system further comprises:

a rewritable magneto-optical data storage medium.

51. A optical disk data storage system for retrieving original bit data stored in an optical disk medium as an even-spaced RLL code signal having rising and falling signal transitions representing a string of first code symbols separated from one another by a plurality of second code symbols occurring at a binary clock rate $F_1$ having a full clock interval $T_1=1/F_1$, wherein a plurality N of said code symbols represents a plurality M of said original data bits according to an even-spaced RLL encoding alphabet in which the number of said second code symbols between any sequential pair of said signal transitions is constrained to an even plurality in the interval, wherein d, k, M and N are positive integers, said optical disk data storage system including a read channel apparatus comprising:

a read circuit coupled to said optical disk medium for retrieving said even-spaced RLL code signal from said optical disk medium;

a rising transition detector coupled to said read circuit for detecting said rising transitions in said even-spaced RLL code signal;

a falling transition detector coupled to said read circuit for detecting said falling transitions in said even-spaced RLL code signal;

a transition delay circuit coupled to said rising transition detector for delaying each said rising signal transition in said even-spaced RLL code signal by one or more said full binary clock intervals $T_1=1/F_1$;

a data synchronizer coupled to said falling transition detector and said transition delay circuit for synchronizing said delayed rising signal transitions and said falling signal transitions to a reduced binary clock rate $F_2=F_1/2$, thereby producing an asymmetric RLL code signal;

a decoder coupled to said data synchronizer for translating said asymmetric RLL code signal to an original bit signal representing said original bit data according to an asymmetric RLL decoding alphabet; and an output means for producing said original bit signal.

52. The system of claim 51 wherein d=1, k=8 and M/N=⅔.

53. The system of claim 52 wherein said asymmetric RLL decoding alphabet is specified according to the table of FIG. 11 herein.

54. A optical disk data storage system for storing original bit data in an optical disk medium as an even-spaced RLL code signal having rising and falling signal transitions representing a string of first code symbols separated from one another by a plurality of second code symbols occurring at a binary clock rate $F_1$ having a full clock interval $T_11/F_1$, wherein a plurality N of said code symbols represents a plurality M of said original data bits according to an even-spaced RLL encoding alphabet such that the number of said second code symbols between any sequential pair of said signal transitions is constrained to an even plurality in the interval, wherein d, k, M and N are positive integers, said optical disk data storage system including a write channel apparatus comprising:

an input for accepting an original bit signal representing said original bit data;

an encoder coupled to said input for creating an asymmetric RLL code signal having rising and falling transitions representing a string of said first code symbols separated by a plurality of second code symbols occurring at a reduced binary clock rate $F_2=F_1/2$, wherein said plurality of N of said code symbols represents a plurality 2M of said original data bits according to an asymmetric RLL encoding alphabet in which the number of second code symbols between any sequential pair of said first code signals is constrained to a value in one of the two alternate constraint intervals and, which are alternated at each said signal transition in said asymmetric RLL code signal;

a transition delay circuit coupled to said encoder for delaying each said falling signal transition in said asymmetric RLL code signal by one or more said full binary clock intervals $T_1=1/F_1$, thereby creating said even-spaced RLL code signal; and a write circuit coupled to said transition delay circuit for writing said even-spaced RLL code signal onto said optical disk medium.

55. The system of claim 54 wherein d=1, k=8 and M/N=⅔.

56. The system of claim 55 wherein said asymmetric RLL encoding alphabet is specified according to the table of FIG. 6 herein.

57. A optical data disk storage system for storing and retrieving original bit data in an optical disk medium as an even-spaced RLL code signal having rising and falling signal transitions representing a string of first code symbols separated from one another by a plurality of second code symbols occurring at a binary clock rate $F_1$ having a full clock interval $T_1=1/F_1$, wherein a plurality N of said code symbols represents a plurality M of said original data bits according to an even-spaced RLL encoding alphabet such that the number of said second code symbols between any sequential pair of said signal transitions is constrained to an even plurality in the interval, wherein d, k, M and N are positive integers, said system comprising:

an input for accepting an original bit signal representing said original bit data;

an encoder coupled to said input for creating asymmetric RLL code signal having rising and falling transitions representing a string of said first code symbols separated by a plurality of second code symbols occurring at a reduced binary clock rate $F_2=F_1/2$, wherein a plurality of N of said code symbols represents a plurality 2M of said original data bits according to an asymmetric RLL encoding alphabet in which the number of second code symbols between any sequential pair of said first code signals is constrained to a value in one of two alternate constraint intervals and, which are alternated at each said signal transition in said asymmetric RLL code signal;

a first transition delay circuit coupled to said encoder for delaying each said falling signal transition in said asymmetric RLL code signal by one or more said full binary clock intervals $T_1=1/F_1$, thereby creating said even-spaced RLL code signal;

a write circuit coupled to said transition delay circuit for writing said even-spaced RLL code signal onto said optical disk medium;

a read circuit coupled to said optical disk medium for retrieving said even-spaced RLL code signal from said optical disk medium;

a rising transition detector coupled to said read circuit for detecting said rising transitions in said even-spaced RLL code signal:

a falling transition detector coupled to said read circuit for detecting said falling transitions in said even-spaced RLL code signal;

a second transition delay circuit coupled to said rising transition detector for delaying each said rising signal transition in said even-spaced RLL code signal by one or more said full binary clock intervals $T_1=1/F_1$;

a data synchronizer coupled to said falling transition detector and said transition delay circuit for synchronizing said delayed rising signal transitions and said falling signal transitions to a reduced binary clock rate $F_2=F_1/2$, thereby producing an asymmetric RLL code signal;

a decoder coupled to said data synchronizer for translating said asymmetric RLL code signal to an original bit signal representing said original bit data according to an asymmetric RLL decoding alphabet; and an output means for producing said original bit signal.

58. The system of claim 57 wherein d=1, k=8 and M/N=⅖.

59. The system of claim 58 wherein said asymmetric RLL encoding alphabet is specified according to the table of FIG. 6 herein; and said asymmetric RLL decoding alphabet is specified according to the table of FIG. 11 herein.

* * * * *